US008543501B2

(12) United States Patent
Lawson et al.

(10) Patent No.: US 8,543,501 B2
(45) Date of Patent: *Sep. 24, 2013

(54) SYSTEMS AND METHODS FOR CAPTURING AND PROCESSING PAYMENT COUPON INFORMATION

(75) Inventors: Mary Elizabeth Lawson, Westerville, OH (US); Joseph Carl Dickerson, Dacula, GA (US); Barbara Wilson Whiteside, Snellville, GA (US); Donald Kenneth Hobday, Blacklick, OH (US); Hans Daniel Dreyer, Pataskula, OH (US)

(73) Assignee: Fiserv, Inc., Brookfield, WI (US)

( * ) Notice: Subject to any disclaimer, the term of this patent is extended or adjusted under 35 U.S.C. 154(b) by 90 days.

This patent is subject to a terminal disclaimer.

(21) Appl. No.: 12/818,961

(22) Filed: Jun. 18, 2010

(65) Prior Publication Data

US 2011/0313917 A1 Dec. 22, 2011

(51) Int. Cl.
*G06Q 40/00* (2012.01)
*G06Q 20/10* (2012.01)
*G06Q 20/32* (2012.01)
*G06K 9/32* (2006.01)

(52) U.S. Cl.
CPC .............. *G06Q 40/00* (2013.01); *G06Q 20/102* (2013.01); *G06Q 20/3276* (2013.01); *G06K 2209/01* (2013.01); *G06K 9/325* (2013.01)
USPC ............................................... 705/40; 705/35

(58) Field of Classification Search
CPC . G06Q 40/00; G06Q 20/102; G06Q 20/3276; G06K 2209/01; G06K 9/325
USPC ........................................................ 705/40, 35
See application file for complete search history.

(56) References Cited

U.S. PATENT DOCUMENTS

| 4,570,156 | A | 2/1986 | Nicholas, Jr. |
| 5,258,855 | A | 11/1993 | Lech et al. |
| 5,369,508 | A | 11/1994 | Lech et al. |
| 5,469,241 | A | 11/1995 | Takahashi et al. |

(Continued)

FOREIGN PATENT DOCUMENTS

WO 0225575 3/2002

OTHER PUBLICATIONS

Lubinski, R. G. (2009). Power up energy savings with a utility database. Buildings, 103(9), 26. Retrieved Jun. 19, 2013.*

(Continued)

*Primary Examiner* — Kito R Robinson
(74) *Attorney, Agent, or Firm* — Sutherland Asbill & Brennan LLP

(57) ABSTRACT

Embodiments of the invention may provide systems and methods for capturing and processing payment coupon information. In one embodiment, a method includes receiving an image representing a payment coupon from a payer and determining an identity of a biller associated with the payment coupon from the image. It may then be determined that no payment coupon metadata for obtaining one or more fields from the payment coupon is stored in association with the biller. The method may then include requesting a respective set of one or more field indicators representing at least an approximate size or an approximate location for one or more fields within the image. Upon receipt, the field indicators for the fields within the image are stored as the payment coupon metadata in association with the biller.

39 Claims, 21 Drawing Sheets

(56) References Cited

U.S. PATENT DOCUMENTS

| | | | |
|---|---|---|---|
| 5,625,465 | A | 4/1997 | Lech et al. |
| 5,768,416 | A | 6/1998 | Lech et al. |
| 5,881,172 | A | 3/1999 | Pintsov |
| 6,823,084 | B2 | 11/2004 | Myers et al. |
| 7,031,553 | B2 | 4/2006 | Myers et al. |
| 7,069,240 | B2 | 6/2006 | Spero et al. |
| 7,168,614 | B2 | 1/2007 | Kotovich et al. |
| 7,171,046 | B2 | 1/2007 | Myers et al. |
| 7,201,323 | B2 | 4/2007 | Kotovich et al. |
| 7,249,717 | B2 | 7/2007 | Kotovich et al. |
| 7,264,163 | B2 | 9/2007 | Heilper et al. |
| 7,286,718 | B2 | 10/2007 | Aradhye |
| 7,333,676 | B2 | 2/2008 | Myers et al. |
| 7,349,884 | B1 * | 3/2008 | Odom et al. ............... 705/40 |
| 7,430,310 | B2 | 9/2008 | Kotovich et al. |
| 7,548,885 | B2 | 6/2009 | Dutta et al. |
| 7,620,268 | B2 | 11/2009 | Myers et al. |
| 7,657,120 | B2 | 2/2010 | Aradhye |
| 7,738,706 | B2 | 6/2010 | Aradhye et al. |
| 7,783,135 | B2 * | 8/2010 | Gokturk et al. ............ 382/305 |
| 8,139,900 | B2 * | 3/2012 | Gokturk et al. ............ 382/305 |
| 8,165,958 | B1 | 4/2012 | McLaughlin et al. |
| 2001/0051915 | A1 | 12/2001 | Ueno et al. |
| 2003/0089780 | A1 | 5/2003 | Goodyear et al. |
| 2003/0177090 | A1 * | 9/2003 | Eden ............................. 705/40 |
| 2004/0247168 | A1 | 12/2004 | Pintsov et al. |
| 2005/0033690 | A1 | 2/2005 | Antognini et al. |
| 2005/0065893 | A1 | 3/2005 | Josephson |
| 2005/0103687 | A1 | 5/2005 | DeWitt et al. |
| 2006/0089907 | A1 | 4/2006 | Kohlmaier et al. |
| 2006/0124727 | A1 | 6/2006 | Kotovich et al. |
| 2007/0041642 | A1 | 2/2007 | Romanoff et al. |
| 2007/0205261 | A1 | 9/2007 | Postnikov et al. |
| 2007/0271183 | A1 | 11/2007 | Foth |
| 2007/0280511 | A1 | 12/2007 | Nepomniachtchi et al. |
| 2008/0086421 | A1 | 4/2008 | Gilder et al. |
| 2008/0109355 | A1 | 5/2008 | Dutta et al. |
| 2008/0118110 | A1 | 5/2008 | Simonsson |
| 2008/0147561 | A1 * | 6/2008 | Euchner et al. ............. 705/64 |
| 2008/0189208 | A1 | 8/2008 | Wilkie |
| 2008/0218812 | A1 * | 9/2008 | Wolf ............................. 358/474 |
| 2009/0067729 | A1 | 3/2009 | Turkelson et al. |
| 2009/0119324 | A1 * | 5/2009 | Simard et al. ............... 707/102 |
| 2009/0119574 | A1 | 5/2009 | Gitlin et al. |
| 2009/0185241 | A1 | 7/2009 | Nepomniachtchi |
| 2009/0185736 | A1 | 7/2009 | Nepomniachtchi |
| 2009/0185737 | A1 | 7/2009 | Nepomniachtchi |
| 2009/0185738 | A1 | 7/2009 | Nepomniachtchi |
| 2011/0091092 | A1 | 4/2011 | Mepomniachtchi et al. |

OTHER PUBLICATIONS

Neat Receipts Mobile Scanner + Digital Filing System Software—Portable Receipt Scanner, Business Card Scanner, and Document Scanner; http://www.yourofficestop.com/net-receipts-compact-portable-receipt-scanner.html; last accessed Jun. 18, 2010.

Appletell reviews ProOnGo Expense for iPhone; http://www.appletell.com/apple/comment/appletell-reviews-proongo-expense-for-iphone/; last accessed Jun. 18, 2010.

Receipt Reader Turns Your Smartphone Camera Into a Receipt Scanner; http://blogs.bnet.com/businesstips/?p=3898; last accessed Jun. 18, 2010.

ProOnGo—Mobile Expense Reporting; http://www.proongo.com; last accessed Jun. 18, 2010.

The Neat Company—NeatReceipts; http://www.neatco.com/products/neatreceipts; last accessed Jun. 18, 2010.

Scan and Pay Services: The Future of Electronic Bill Presentment; http://reports.celent.com/PressReleases/20000524/lockbox.htm; last accessed Jun. 18, 2010.

Paytrust® Online Bill Pay, Bill Payment Service, Pay My Bills, Pay Bills Online; http://paytrust.com/compare-paytrust-online-bill-pay-services.shtml; last accessed Jun. 18, 2010.

CyberBills Pioneers TOTAL Web-based Bill Management (NetBanker); http://www.netbanker.com/1999/03/cyberbills_pioneers_total_webb.html; last accessed Jun. 18, 2010.

The Consumer Capture Opportunity—Here we go again?, presented by Celent; http://www.remotedepositcapture.com/files/Webinars/RDC%20Consumer%20Capture.pdf; last accessed Jun. 18, 2010.

Consumer Source Capture; http://www.checkfreesoftware.com/cda/software/L5.jsp?layoutId=51629&contentId=51624&menuId=51633&pId=60524; last accessed Jun. 18, 2010.

Best Practices Guide: Consumer Capture (Fiserv); http://www.sco.fiserv.com/ContentDocumentHandler.ashx?documentId=3022; last accessed Jun. 18, 2010.

Non-final Office Action of U.S. Appl. No. 12/818,964, filed Jun. 18, 2010 (mailed Nov. 18, 2011).

Final Office Action for related U.S. Appl. No. 12/818,964 mailed Apr. 13, 2012.

Non-Final Office Action for related U.S. Appl. No. 12/818,964 mailed Apr. 19, 2013.

* cited by examiner

Scan and Pay

- Please review the information scanned from your bill and correct any mistakes.
- Click Pay Bill when you are ready to pay this bill (you'll have a chance to review and confirm before the payment is made).
- We've set a payment date for you (the most immediate one available) – you can change it if you'd like.

Biller Information

- Name: POWER Co.
- Address: P.O. Box 848
- City: Boston
- State: MA
- Zip: 21213

Bill Details

- Account Number: 1234567-8
- Amount Due: 457.00
- Date Due:
- Payment Date: 11/12/2009

[Cancel]  [Pay Bill]

Scan and Pay

Please review the following and select confirm payment if the information is correct.

| | |
|---|---|
| Biller: POWER Co. | Amount: $457.00 |
| Account Number: 1234567-8 | Pay Date: 11/10/2009 |

( Cancel )  ( Edit )  ( Confirm Payment )

Scan and Pay                                                       [X]

We were unable to identify key information needed to scan this bill. Please click the content indications below for instructions on identifying the layout of the bill.

Budget Forward $418.00   Current $457.00   Budget Due $875.00

PaySmart Plan: Automatic Withdrawal.
Please do not pay.

Interest on overdue amounts is calculated at 1.5% per month or part thereof (19.56% per annum).

POWER Co.
PO Box 848
Austin, TX 78701
www.power.com

Account Number 1234567-8  Automatic Withdrawal        $457.00

XYZ Company
123 Your Street
Your Town, Your State Zipcode 0123456 000000045700 000000045700

1:0 2740-9001:            96

[ Biller Address ]
[ Account Number ]
[ Amount Due ]
[ Date Due ]
[ Balance ]

[ Preview ]
[ Scan and Pay ]

SYSTEMS AND METHODS FOR CAPTURING AND PROCESSING PAYMENT COUPON INFORMATION

FIELD OF THE INVENTION

Aspects of the invention relate generally to monetary payments, and more particularly to systems and methods for capturing and processing payment coupon information.

BACKGROUND OF THE INVENTION

Many solutions exist to provide capabilities to consumers or other bill recipients for online processing and payment of bills. In one instance, a consumer who receives a hardcopy or paper bill can proceed to pay the bill electronically using an online payment and processing system. The systems may be offered through the consumer's financial institution, by the biller, or by a third party service provider. To process an online payment for a hardcopy bill, there are many steps to be performed and hurdles to overcome in order to achieve successful payment, particularly if the consumer has never paid the biller before. For example, a consumer typically has to first set up the biller as a personal biller of the consumer, which may include selecting from a list and/or manually entering in biller information. In addition, the consumer then has to enter the payment particulars (e.g., a payment amount and payment date) each time a new payment is to be processed. Such manual data entry processes are susceptible to user error (e.g., miskeying information, etc.) and can be time consuming.

These hurdles and possible complications to process bill payment requests based on hardcopy bills may adversely impact the adoption of electronic bill payment. Consumers may ultimately conclude it is easier to write and mail a paper check with the bill's payment coupon in the provided envelope, as has conventionally been the practice.

BRIEF DESCRIPTION OF THE DRAWINGS

Reference will now be made to the accompanying drawings, which are not necessarily drawn to scale, and wherein:

FIGS. 6A-6F illustrate example user interfaces, according to example embodiments of the invention.

DETAILED DESCRIPTION

Figure 1:
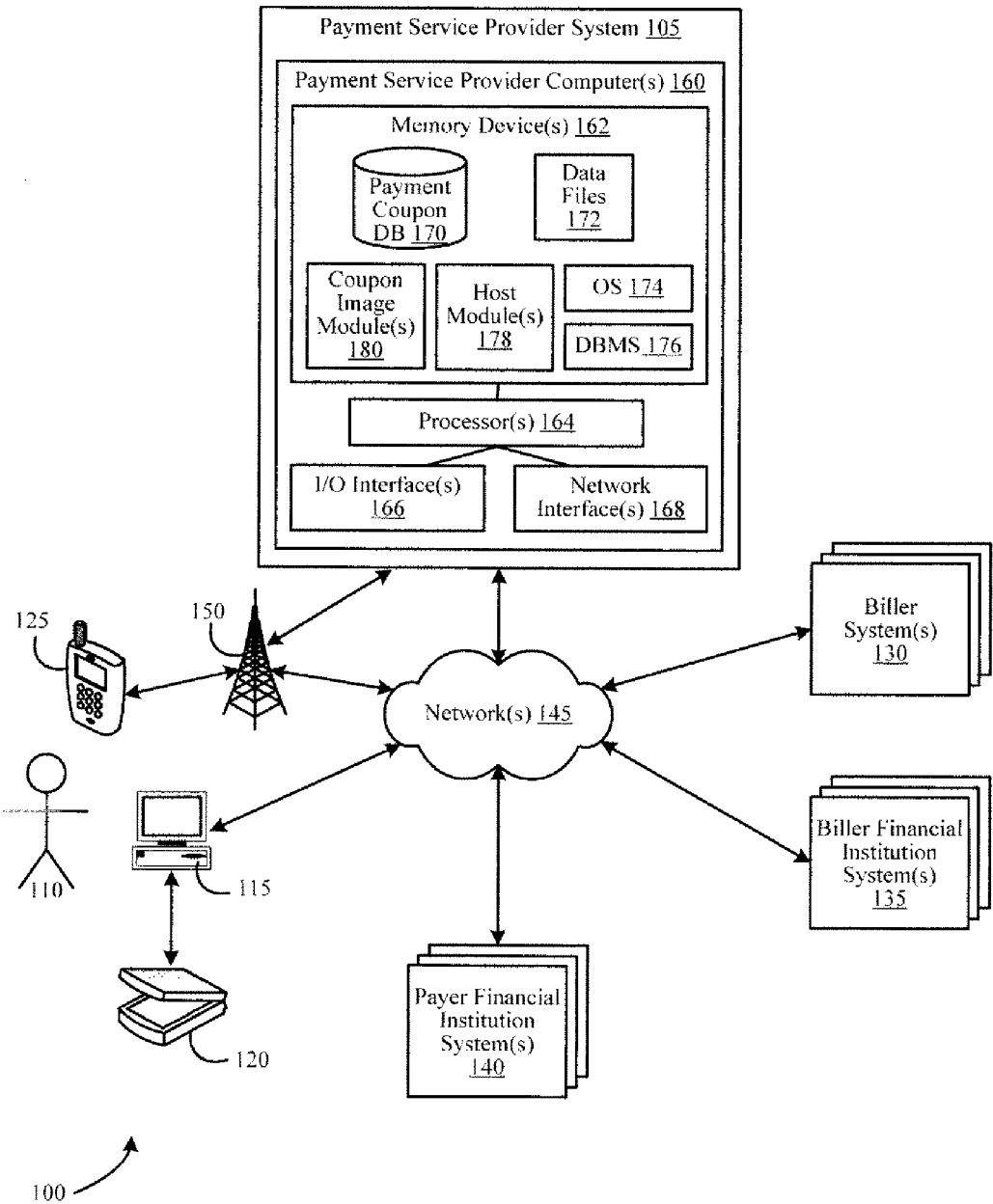
FIG. 1 illustrates an overview of an example system for capturing and processing payment coupon information, according to an example embodiment of the invention.

The invention will now be described more fully hereinafter with reference to the accompanying drawings, in which example embodiments of the invention are shown. This invention may, however, be embodied in many different forms and should not be construed as limited to the example embodiments set forth herein; rather, these example embodiments are provided so that this disclosure will be thorough and complete, and will fully convey the scope of the invention to those of ordinary skill in the art. Like numbers refer to like elements throughout.

Embodiments of the invention may provide systems and methods for capturing and processing payment coupon information. For example, according to one embodiment, payment coupon information, which may be typically provided as part of or otherwise accompany a hardcopy bill from a biller, may be scanned or otherwise converted to a digital image from which payment coupon information can be obtained by a payment service provider system. For example, upon receiving a payment coupon image, a payment service provider system may extract values for each of the fields on the payment coupon image. These field values may be utilized by the payment service provider to perform subsequent processing, such as to process the corresponding payment, to add the biller to the payer's biller list, and/or to activate the biller as an electronic biller. Accordingly, by allowing a payer to scan a coupon image and transmit it to a payment service provider system for processing, the payer's efforts and time to process a payment request can be minimized.

In one example embodiment, a payment service provider system may store payment coupon layout information (also referred to herein as "payment coupon metadata") for a number of payment coupon types that will allow quick detection and determination of payment coupon field values when a scanned image is received. In one embodiment, if the payment service provider system, upon receiving a scanned payment coupon image, determines that no payment coupon metadata exists for the payment coupon (e.g., none stored for the biller or the type of payment coupon), then payment coupon layout information may be requested from the payer. For example, the payer may graphically and/or textually provide information that indicates location, size, geometry, content, values, etc., corresponding to one or more of the payment coupon fields. Thus, upon receiving this payment coupon layout information, the payment service provider system can then process the instant payment coupon image and store the payment coupon layout information with the payment coupon metadata to facilitate the processing of subsequent payment coupon images from the same biller and/or of the same type.

According to various embodiments, payment coupon images may be scanned payment coupon images obtained from a payer's computer and scanner device or they may be payment coupon photographs taken from a camera on a payer's mobile device. Moreover, in some embodiments, a payer may provide to a payment service provider system multiple payment coupon images at once, to enable batch processing for all of the payment coupons, further simplifying the efforts required by the payer.

As used herein, the term "payer" generally refers to an individual who is enrolled or registered with a payment service requesting or otherwise providing payment to another entity, such as a biller, via the payment service. Thus, the term "biller" generally refers to an entity receiving payment, such as may be received via an electronic payment application provided by the payment service. The term "payment service provider" generally refers to an entity operable to process payment requests made by payers and to effectuate or direct payments to billers. The payment service provider may include any number of systems and or processing components, which may generally be referred to as a "payment service provider system," to facilitate the processing of payment requests. Payment requests can be received by a payment service provider system directly from a payer, or from any other entity on behalf of a payer. Though, according to some embodiments, a service provider is not limited to a payment service provider, and can generally refer to any entity facilitating transactions with other entities on behalf of its customers.

I. System Overview

FIG. 1 illustrates an example system 100 to facilitate capturing payment coupon information from a payer's device, according to an example embodiment of the invention. Although various computing devices and/or computers are illustrated in FIG. 1, it is appreciated that corresponding entities and/or individuals are associated with each of the computers illustrated. According to various embodiments, there may be: one or more payment service provider systems 105, each associated with one or more payment service provider computers 160 or payment service provider computing devices; one or more biller systems 130, which may likewise be associated with one or more computers or computing devices; and one or more biller financial institution systems 135, which may likewise be associated with one or more computers or computing devices. There may also be one or more payers 110, each being associated with one or more of: a computer 115, a scanning device 120, and/or a mobile device 125. The payer 110 may also be associated with one or more payer financial institution systems 140, which may likewise be associated with one or more computers or computing devices. According to various embodiments, there may be any number of each entity type, and each entity may be associated with any number of suitable computers, computing devices, and/or other devices. For simplicity, the computers, devices, and/or entities may be referenced in the singular, but it is appreciated that the same description applies to embodiments including multiple computers, devices and/or entities. Similarly, for each of the computers described herein, it is appreciated that the computer may include any number of suitable components and/or functionality. Moreover, although detailed descriptions of system components are provided for the payment service provider system 105 and its corresponding payment service provider computer(s) 160, it is appreciated that any of the biller systems, the biller financial institution systems, and the payer financial institution systems may be configured in any suitable manner, which may be similar to that described herein for the payment service provider system 105.

As shown in FIG. 1, one or more of a payment service provider system 105, a payer's computer 115, a biller system 130, a biller financial institution system 135, and/or a payer financial institution system 140 may be in communication with each other via one or more suitable networks 145, which, as described below, can include one or more separate or shared private and/or public networks, including the Internet or a publicly switched telephone network. In addition a payer 110 may communicate with any of the aforementioned systems via a payer's mobile device 125 over one or more wireless networks 150, which may additionally be in communication with the network or networks 145. For example, as discussed below in more detail, according to various embodiments, the payment service provider system 105 may be operable to receive one or more scanned payment coupon images from a payer's computer 115 and/or a payer's mobile device 125, or in other embodiments from kiosks or other standalone devices operable for communication with the payment service provider system 105, such as may be present in a retail establishment. The payment service provider system 105 may then communicate with a designated biller system 130 for processing the payment therewith, while also communicating a credit directive to a corresponding biller financial institution system 135 and/or a debit directive to the payer's financial institution system 140. These components will now be discussed in further detail.

The payment service provider system 105 may include any number of payment service provider computers 160 that facilitate the processing of scanned payment coupon images and payment requests. A payment service provider computer 160 may be any suitable processor-driven device that facilitates the receipt and/or processing of scanned payment coupon images and/or payment requests, such as, but not limited to, a server computer, a mainframe computer, one or more networked computers, a desktop computer, a personal computer, a digital assistant, a personal digital assistant, a digital tablet, an Internet appliance, an application specific circuit, a microcontroller, a minicomputer, or any other processor-based device. The execution of suitable computer-implemented instructions by the payment service provider computer 160 may form a special purpose computer or other particular machine that is operable to facilitate the receipt and processing of scanned payment coupon images and/or payment requests transmitted by payers. Although a single payment service provider computer 160 is described herein, the operations and/or control of the payment service provider computer 160 may be distributed among any number of computers and/or processing components.

In addition to having one or more processors 164, the payment service provider computer 160 may include one or more memory devices 162, one or more input/output ("I/O") interfaces 166, and one or more network interfaces 168. The memory devices 162 may be any suitable memory devices, for example, caches, read-only memory devices, random access memory devices, magnetic storage devices, removable storage devices, etc. Additionally, any number of logical data storage constructs may be stored as desired within the memory devices 162, such as a payment coupon database 170 or any other suitable databases. The memory devices 162 may further store a wide variety of data, such as by data files 172. Additionally, the memory devices 162 may store executable instructions and/or various program modules utilized by the payment service provider computer 160, for example, an operating system 174, a database management system ("DBMS") 176, a coupon image module 180 and/or one or more host modules 178.

The data files 172 and/or the payment coupon database 170 may include any suitable data that facilitates the receipt and/or processing of payment coupon images and/or payment requests by the payment service provider computer 160. For example, the data files 172 and/or other databases may include data utilized when processing payment requests, such as, but not limited to, payer information, biller information, financial institution information, processing logic, business rules, and the like. In one example, the payment coupon database 170 may include information associated with various payment coupons, such as, but not limited to, biller information, payment coupon size, dimension, approximate field locations, field types, and the like for a number of billers and/or coupon types. As described below, the information in the payment coupon database 170 may be collected from payer-transmitted payment coupon images or photographs, or may be obtained from billers or other service providers. As used herein, the terms "payment coupon metadata" and "payment coupon information" may be used interchangeably to generally refer to any information stored regarding the layout and/or content of various payment coupons. It is appreciated that the illustration of a payment coupon database 170 as a separate database from the data files 172 and/or any other data storage means is provided for illustrative purposes, and that any data may be stored in any arrangement, separate or together with other data stored by the payment service provider computer 160.

The operating system ("OS") 174 may be a suitable software module that controls the general operation of the payment service provider computer 160. The OS 174 may also facilitate the execution of other software modules by the one or more processors 164, for example, the coupon image module 180 and/or the host module(s) 178. The OS 174 may be, but is not limited to, Microsoft Windows®, Apple OSX™, Linux, Unix, or a mainframe operating system. The host modules 178 may include any number of suitable host modules, such as Web servers, email servers, short message service ("SMS") processing applications, multimedia message service ("MMS") processing applications, and/or various other modules associated with and/or in communication with the payment service provider system 105. The host modules 178 may facilitate the receipt of payment coupon images or photographs and/or a payment request from a payer 110. The host module 178 may additionally facilitate communications with a designated biller system 130, biller financial institution system 135, and/or payer financial institution system 140 associated with a payment coupon image or photograph or a payment request.

Additionally, in certain embodiments, the host modules 178 may be configured to generate and/or to present a wide variety of different interfaces and/or graphical user interfaces, such as one or more public and/or private interfaces that facilitate the receipt of a payment coupon image or photograph and/or a payment request from a payer 110 and one or more public and/or private interfaces that facilitate communications with a biller system 130. A public interface may be a webpage or a mobile webpage that is generally available to the public. A private interface may be an interface that is restricted to registered users of the payment service provider system 105 and/or a partner entity (e.g., a partner financial institution) of the payment service provider system 105. As desired, a private interface may be branded in accordance with specifications and/or preferences of a partner entity. Additionally, as desired in certain embodiments, the host modules 178 may be configured to provide a web services interface layer to another entity or component of the system 100.

The coupon image module 180 may be operable, configured, and/or programmed to receive one or more payment coupon images or photographs provided by a payer 110 and/or to process a received payment request associated with a payment coupon image or photograph. Payment coupon images or photographs (which may be collectively referred to herein as "images") may be received by the payment service provider system 105 from a payer's computer device 115 over the network 145, such as the Internet, or from a payer's mobile device 125 over a wireless network 150 and/or the network 145. In one embodiment, if a payer's mobile device 125 is used to transmit a payment coupon photograph by accessing a webpage associated with the payment service provider system 105, the payment coupon photograph may be received in the same or similar manner as one transmitted from a payer's computer device 115 over the network 145. In another embodiment, if a payer's mobile device 125 is used to transmit a payment coupon photograph to the payment service provider system 105, the payment coupon photograph may be transmitted as a text message (e.g., an MMS message) over the wireless network 150 to a text message server operated by or otherwise associated with the payment service provider system 105 for receiving text messages. Accordingly, the coupon image module 180 may be configured and operable to receive payment coupon images and associated information over a wireless network as a text message over the wireless network 150 and/or as web (or other network) messages over a network 145. In response, the coupon image module 180 processes the coupon image to determine whether payment coupon metadata already exists for the type of payment coupon image received, transacts with the payer device(s) to obtain additional information if necessary, stores and/or updates existing payment coupon metadata or other information (e.g., in the payment coupon database 170, etc.) and, optionally, processes one or more payment requests with one or more biller systems 130, biller financial institution systems 135, and/or payer financial institution systems 140 associated with the payment coupon image received. Additional details of the operations of the coupon image module 180 and/or additional payment service provider system 105 operating logic and functionality are provided below with reference to FIGS. 2A-10B.

With continued reference to the payment service provider computer 160, the one or more I/O interfaces 166 may facilitate communication between the payment service provider computer 160 and one or more input/output devices; for example, one or more user interface devices, such as a display, keypad, mouse, pointing device, control panel, touch screen display, remote control, microphone, speaker, etc., that facilitate user interaction with the payment service provider computer 160. The one or more network interfaces 168 may facilitate connection of the payment service provider computer 160 to one or more suitable networks, for example, the network(s) 145 and/or the wireless network 150 illustrated in FIG. 1, or local area network(s) within the Payment Service Provider System 105. In this regard, the payment service provider computer 160 may receive and/or communicate information to other components of the system 100, such as the payer's computer 115, the payer's mobile device 125, the biller system 130, the biller financial institution system 135, and/or the payer financial institution 140. As desired, any number of webpages, interface screens, and/or other presentations (e.g., graphical user interfaces, etc.) may be provided or presented to a payer 110, a biller system 130, a biller financial institution system 135, and/or a payer financial institution system 140 via the network interfaces 168.

With continued reference to FIG. 1, a payer 110 who presents one or more payment coupon images for processing by the payment service provider system 105 may be associated with any number of payer devices, such as a computer 115, a scanner device 120, and/or a mobile device 125. Any of the aforementioned payer devices may generally facilitate the generation and communication of payment coupon images, as well as additional corresponding communications, with the payment service provider system 105. A computer 115 may include, but is not limited to, a personal computer, a laptop computer, or any other suitable processor-based device. A scanner device 120 may include any suitable image scanner operable to convert any image into digital data, such as, but not limited to, a flatbed scanner, a feed scanner, a combination printer/scanner, a wand scanner, a hand scanner, a film scanner, etc. A mobile device 125 may include any device operable for wireless communication means (e.g., cellular, satellite, wi-fi Internet communications, WiMAX network communications, and the like), such as, but not limited to, a mobile phone, a pager device, a smart phone, any other mobile communications device, a personal audio player, a personal device assistant, a laptop computer, a portable computer, or any other suitable portable device operable for wireless communications. Each mobile device 125 may include a camera or other means for capturing a digital image of a payment coupon.

As an example, according to one embodiment, the computer 115 may be operable to interface with the scanner device 120 to generate payment coupon images utilizing the scanner device 120 and to transmit payment coupon images to the payment service provider system 105 over a network 145 (e.g., the Internet, etc.). A payer 110 may further utilize the computer 115 to receive and respond to messaging from the payment service provider system 105 over the network 145, such as, but not limited to, to provide field indicators, field types, and/or additional information regarding a payment coupon image and/or to provide payment request information. According to another embodiment, a payer 110 may instead, or additionally, utilize a mobile device 125 (e.g., a mobile phone having a camera) to capture a digital image of a payment coupon, and to identify field indicators, field types, and/or other additional information regarding a payment coupon image. A mobile device 125 may thus be operable to transmit and to receive data over a wireless network 150, and may further be operable to access one or more webpages operated by, or otherwise associated with, the payment service provider system 105 over the Internet. For example, a mobile device 125 may be configured for Internet (or other network 145) access using the wireless network 150, for text messaging (e.g., SMS and/or MMS messages, etc.) over the wireless network 150, for email communications over the wireless network 150 and/or the Internet (or other network 145), and the like.

Accordingly, each of the various types of payer devices may include a wide variety of suitable components as desired in various embodiments of the invention. For example, a payer's computer 115 or mobile device 125 may be a suitable processor-driven device that includes a client module, such as an Internet browser or other dedicated program, that facilitates communication with the payment service provider system 105, for example, the host module 178 (e.g., a web server, a text message server, an email server, etc.). In certain embodiments, more than one payer device may be utilized by a payer 110. For example, a first payer device may be utilized by the payer 110 to scan and transmit a payment coupon image to the payment service provider system, and a second payer device may be utilized by the payer 110 to transmit a payment request to the payment service provider system 105.

Although not described or illustrated in detail, each biller system 130, biller financial institution system 135, and payer financial institution system 140 may be configured in the same or similar manner as described for the payment service provider system 105. For example, each biller system 130, biller financial institution system 135, and payer financial institution system 140 may include one or more processor-based computers operable to store and execute computer-executable instructions, each having one or more processors, memories, I/O interfaces, network interfaces, operating systems, data files, databases or other data storage means, DBMS, host modules and other operating logic to perform some or all of the same or similar functions as are described herein with reference to the payment service provider system 105.

The network 145 may include any number of telecommunication and/or data networks, whether public, private, or a combination thereof, including but not limited to, the Internet, a local area network, a wide area network, an intranet, intermediate handheld data transfer devices, public switched telephone networks, and/or any combination thereof and may be wired and/or wireless. The wireless network 150 may be any wireless network operable for wireless communications operating under any cellular or other wireless network protocol (e.g., GSM, CDMA, TDMA, etc.). In addition, the wireless network 150 may provide wireless connectivity with the network 145 (e.g., the Internet). The network 145 and the wireless network 150 may also allow for real-time, off-line, and/or batch transactions to be transmitted thereover. Due to network connectivity, various methodologies described herein may be practiced in the context of distributed computing environments. Although the system 100 is shown for simplicity as including one intervening network 145 and one wireless network 150, it is to be understood that any other network configuration is possible, which may optionally include a plurality of networks, each with devices such as gateways and routers, for providing connectivity between or among networks.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the invention should not be construed as being limited to any particular operating environment, system architecture, or device configuration.

II. Operational Overview

Figure 2A:
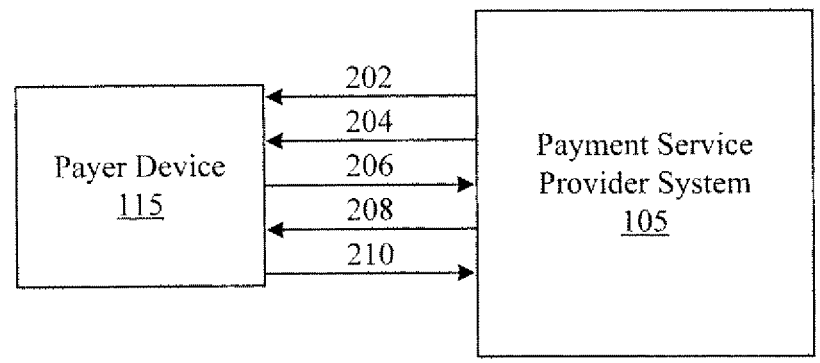
FIGS. 2A-2C illustrate example sets of data flows for capturing and processing payment coupon information, according to example embodiments of the invention.
Figure 2B:
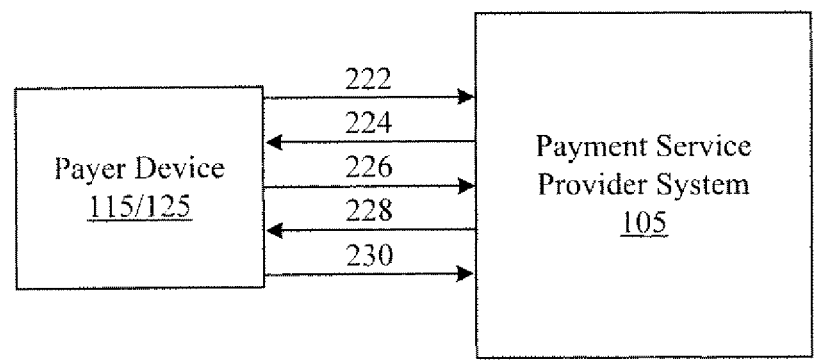
Figure 2C:
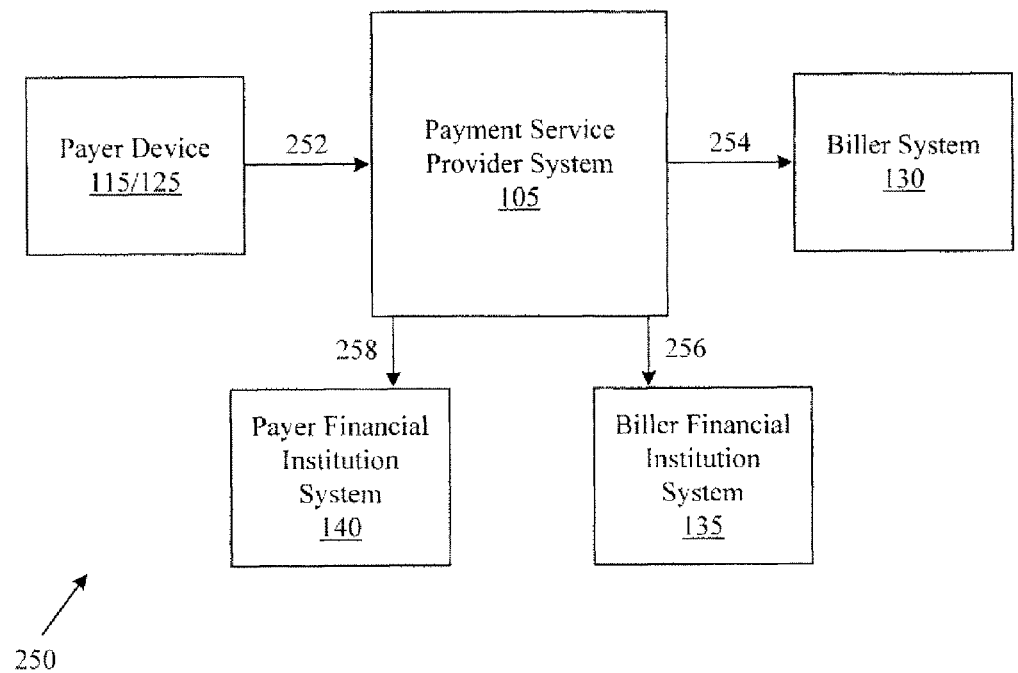

FIGS. 2A-2C illustrate example data flows for processing payment coupon images received from a payer, according to example embodiments of the invention. FIG. 2A illustrates an example set of data flows 200 in which a payer accesses a web-based payment coupon imaging application for transmitting a payment coupon image to a payment service provider system 105, according to one embodiment. For example, a payer may utilize a payer device, such as a computer 115, to access the web-based payment coupon imaging application over a network 145, such as the Internet. As used herein, the terms "web-based application" and "thin client application" may be used interchangeably to generally refer to applications accessed over a network for which much, if not all, of the associated processing is performed remote from the payer (or other entity) accessing and/or otherwise utilizing the application, such as via a web browser. It is appreciated, however, that, in some embodiments, even a "web-based" or "thin client" application may include some functionality that can be executed locally.

Accordingly, with continued reference to the set of data flows 200 of FIG. 2A, web-based payment application webpages 202 may be transmitted from the payment service provider system 105 to the computer 115. In one embodiment, one or more additional applets 204 or other applications may be transmitted to the computer 115 and stored thereon for local execution, which may be utilized to issue control commands and otherwise interact with a scanner device 120 when scanning payment coupon images. It is appreciated, however, that in other embodiments, additional applets 204 or other applications may not be needed, and scanner device 120 control may be provided entirely within/from the webpage or webpages 202 accessed. Upon scanning, one or more payment coupon images 206 are transmitted from the computer 115 to the payment service provider system 105 for processing. When processing each payment coupon image 206, the payment service provider system 105 may in some instances request additional information and/or request confirmation or modification by one or more subsequent webpages 208 transmitted to the payer's computer 115, and the payer may respond 210 thereto. For example, in one embodiment, for a payment coupon associated with a biller for which the payment service provider system 105 does not already have any payment coupon metadata stored, the payer may provide payment coupon layout information in the response 210. The payment service provider system 105 may therefore store and/or update payment coupon metadata or other information, which may be used to for subsequent payment request processing for the instant transaction and/or for later transactions for a same or similar payment coupon image. It is appreciated that additional communications may be exchanged between the payment service provider system 105 and the payer's computer 115 (and/or other payer device), and that the aforementioned data flow is provided for illustrative purposes.

FIG. 2B illustrates an example set of data flows 225 in which a payer utilizes, at least in part, a locally stored and executed payment coupon imaging application for scanning and transmitting a payment coupon image to a payment service provider system 105, according to one embodiment. Applications which are stored and/or executed locally on the payer's computer 115 (or other payer device) may be generally referred to herein as "fat client applications" or "local applications." It is appreciated that, in some embodiments, a combination of local and web-based payment coupon imaging applications may be utilized to perform various operations described herein. In the embodiment of FIG. 2B, a payer may submit request 222 for a local payment coupon imaging application to facilitate payment coupon image scanning and transmitting. The local payment coupon imaging application 224 may be transmitted from the payment service provider system 105 (or any other system from which the local application may be available). After downloading and installing the local payment coupon imaging application 224, it may be executed to control a scanner device 120 to generate a digital image of one or more payment coupons and to transmit one or more payment coupon images 226 to the payment service provider system 105 for processing. To transmit the payment coupon image or images 226, the local payment coupon imaging application may establish a communication link between the computer 115 and the payment service provider system 105 over the network, such as by accessing one or more webpages over the Internet or by initializing a private network session therebetween. Like that described with reference to the set of data flows 200 illustrated by FIG. 2A, in response to receiving the payment coupon image or images 226, the payment service provider system 105 may then request additional information and/or request confirmation or modification by one or more subsequent webpages 228 transmitted to the payer's computer 115, and the payer may respond 230 thereto, after which the payment service provider system 105 may therefore store and/or update payment coupon metadata or other information.

In another embodiment, the set of data flows 225 may similarly represent communications between a payer's mobile device 125 and the payment service provider system 105 in the same or similar manner as described for a computer 115. For example, a local payment coupon imaging application 224 may be downloaded and installed on the mobile device 125, which may be used to control or otherwise interact with the camera of the mobile device 125 for generating a digital payment coupon photograph. The payment coupon photograph 226 may likewise be transmitted over the Internet (or another network 145) or may be transmitted as a text message (e.g., a MMS message) over a wireless network 150 to the payment service provider system 105. The payment service provider system 105 may likewise request additional information and/or request confirmation or modification by one or more webpages 228 (or one or more text messages) sent to the mobile device 125, to which the payer may respond 230 accordingly.

FIG. 2C illustrates an example set of data flows 250 for receiving and processing a payment request associated with a payment coupon image, according to one embodiment. According to this embodiment, the payment service provider system 105 receives a payment request 252 from a payer device, such as a computer 115 or a mobile device 125. According to one embodiment, the payment request 252 may be embodied as, or otherwise associated with, a payment coupon image transmitted by the payer to the payment service provider system, such as is described with reference to FIGS. 2A-2B. For example, the payment service provider system 105 may treat a received payment coupon image as a payment request 252. In another embodiment, a payment request 252 may be transmitted at some time after transmitting the corresponding payment coupon image, such as if the payment coupon imaging application subsequently inquires whether a payment request is to be processed in association with the received payment coupon image. In response to receiving a payment request 252, the payment service provider system 105 may process the information associated therewith. Example processing may include, but is not limited to, identifying the payer and corresponding account information and/or other identifiers, the payment amount, the payment date, the biller to which the payment is to be issued, the biller's financial institution system and corresponding account information, the payer's financial institution system information, and the like. For example, to complete the payment as requested by the payment request 252, the payment service provider system 105 may transmit notification of or otherwise post 254 the corresponding payment to the biller system 130, direct a credit 256 by an amount associated with the payment request 252 to the corresponding financial account of the biller at a biller financial institution system 135, and direct a debit 258 to the payer's account at the payer financial institution system 140 by the same amount (or greater if there are fees associated therewith) associated with the payment request 252. In this regard, a payment from the payer to the biller may be completed. A wide variety of suitable communication networks 145 may be utilized to facilitate communication of the credit directive 256 and/or the debit directive 258 as desired in various embodiments of the invention. For example, an Automated Clearing House ("ACH") network, banking network, the Internet, and/or any other suitable private or public network may be utilized. It is appreciated that the aforementioned data flow is provided for illustrative purposes, and that additional communications may be exchanged between the payment service provider system 105, the payer's computer 115 (and/or other payer device), the biller system 130, the biller financial institution system 135, and/or the payer financial institution system 140, such as confirmation communications, and the like. Moreover, in some embodiments, a payment request may not result from a payer transmitting one or more payment coupon images, such as if the payment coupon images are only used for adding a biller to the payer's list of approved billers or as an electronic biller for the payer.

It is appreciated that the above-described sets of data flows 200, 225, 250 are provided for illustrative purposes, are not intended to be limiting, and that other operations may be performed to capture and transmit one or more payment coupon images to a payment service provider system and to perform subsequent processing responsive thereto. Additional variations will be apparent in light of the following flow diagrams describing example operations in more detail.

Figure 3:
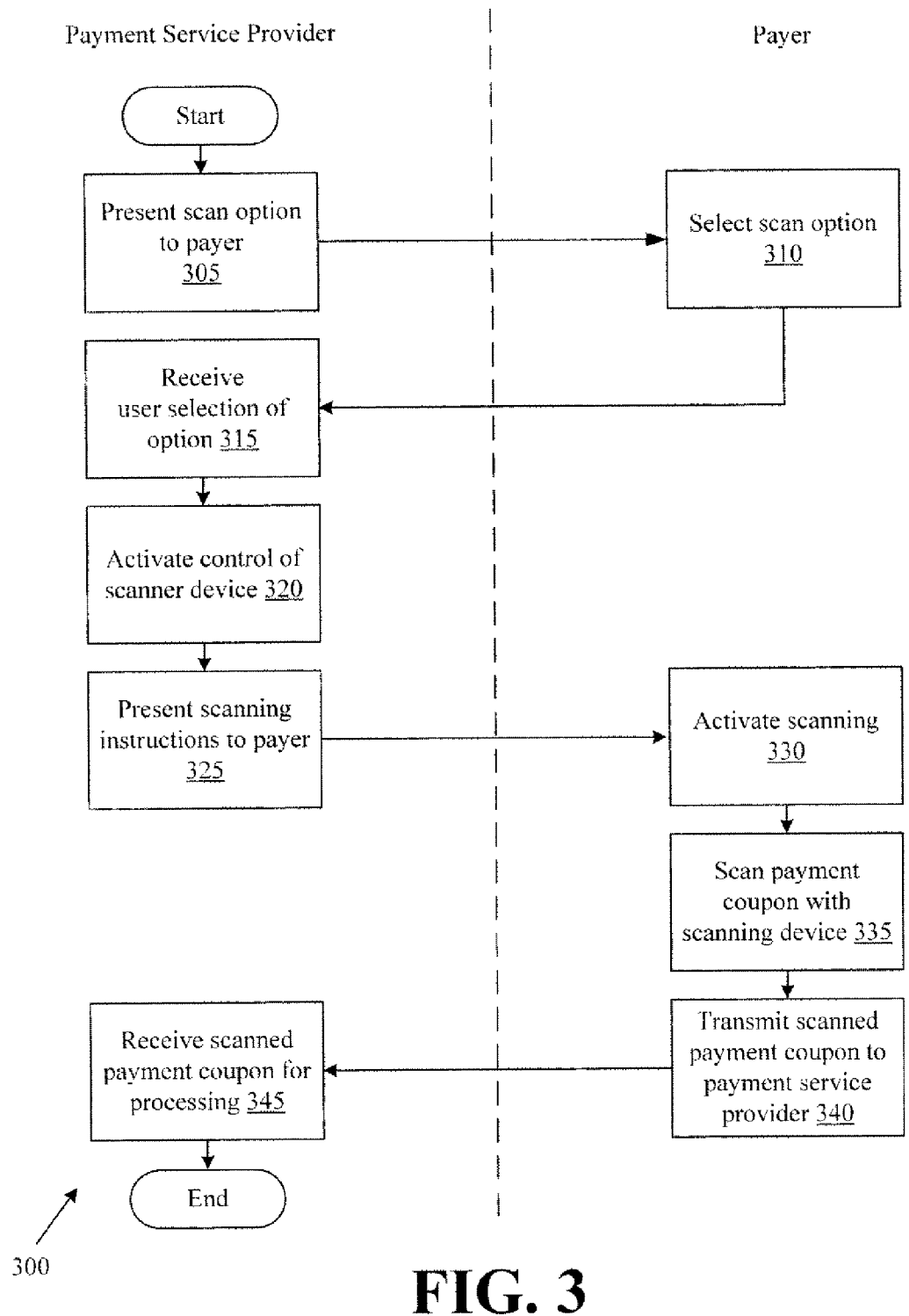
FIG. 3 illustrates a flow diagram of an example method for scanning a payment coupon, according to an example embodiment of the invention.

FIG. 3 represents a flow diagram of an example method 300 for capturing a payment coupon image by a payer and transmitting the payment coupon image to a payment service provider for processing, according to one embodiment. In example embodiments, certain operations of the method 300 may be performed by one or more payment service provider computers associated with a payment service provider system, such as the payment service provider computers 160 associated with the payment service provider system 105 described with reference to FIG. 1, while other operations may be performed by a payer's computer and scanner device in communication therewith, such as a computer 115 and scanner device 120 described with reference to FIG. 1. However, in other embodiments, certain operations of the method 300 may be performed by one or more other components, such as by one or more suitable financial institution systems instead of, or in addition to, the operations performed by the payment service provider system.

According to various example embodiments, a payment coupon imaging application may be accessed over a network 145, such as the Internet, by a payer 110 utilizing a web browser of a computer 115. In one embodiment, the payment coupon imaging application may be a thin client application operated by or on behalf of a payment service provider. In another embodiment, the payment coupon imaging application may be a fat client application installed and executed locally by the payer's computer 115, which may be downloaded over the network 145 from the payment service provider system 105 (or other system) or installed from local media (e.g., removable disc, removable storage drive, etc.). Even with a fat client implementation, network 145 access will be provided between the payer's computer 115 and the payment service provider system 105 to transmit scanned payment coupon images and to exchange subsequent communications while processing the payment coupon images. In yet other embodiments, the payment coupon imaging application may be provided as a combination of thin and fat client applications, accessed over the network 145 and executed utilizing a web browser, but having some functionality provided by locally executed applications, such as web applets operable for controlling or otherwise interacting with a scanner device 120 in communication with the computer 115.

For example, in one embodiment, a local application component may be downloaded over the network 145 to the computer 115 each time the payment coupon imaging application is invoked and one or more webpages are delivered. The local application component may be provided by software code embedded in one or more webpages (e.g., Javascript code, ActiveX, etc.) which may be downloaded as an accompanying application applet when one or more webpages are delivered, although it need not be persisted locally at the computer 115. In another embodiment, a local application component, such as, but not limited to, an ActiveX control, a Javascript applet, or other suitable programming embedded in or associated with one or more webpages of the payment coupon imaging application, may be similarly downloaded to the computer 115 once the first time the payment coupon imaging application is invoked and one or more webpages are delivered. However, in this embodiment, the local application component may be persisted locally at the computer 115 so that it only needs to be downloaded or otherwise updated again if the version is no longer up-to-date, which may be accomplished by any suitable mean. In yet another embodiment, one or more webpages of the payment coupon imaging application may invoke one or more operating system functions from within the webpage that are operable to provide access to and interaction with the scanner device 120 and other local functionality (e.g., access to memory, etc.). It is appreciated that the aforementioned example implementations are provided for illustrative purposes only, and that any other suitable implementation for providing payment coupon imaging scanning and transmitting functionality between a payer's computer 115 and a payment service provider system 105 may be provided, according to various embodiments. Moreover, while the following method 300 is described as occurring between the payer (on the ride side of the figure) and a payment service provider (on the left side of the figure), it is appreciated that the same or similar methods (and other methods described herein) can be performed by and between other entities, such as between the payer and a biller, between the payer and a biller financial institution, between the payer and a payer financial institution, and the like.

Figure 6A:

With continued reference to FIG. 3, the method 300 may begin at block 305. At block 305, an option to scan a payment coupon image may be presented to the payer 110. For example, when accessing an online bill payment application, one or more webpages may present the option. In one embodiment, a separate webpage providing payment coupon scanning capabilities may be presented, which may be accessible from a separate tab or other separate module accessible within the online bill payment application. In another embodiment, a payment coupon scanning option may be presented along with other payment processing options, such as, but not limited to, an option that is selectable (e.g., hyperlink, radio button, etc.) after selecting to make a payment. FIG. 6A illustrates an example user interface 605 presenting an option to scan a payment coupon with each biller for which the option may be available (the "use scan-and-pay" hyperlink), according to one embodiment. The user interface 605 may be the first webpage from which a payment coupon scanning option is available, or it may be a subsequent webpage presented after a payer 110 initially selects the option from a first webpage. In one embodiment, the user interface 605 may not be a separate webpage, but instead may be a separate window that executes from within another webpage. It is appreciated that any number of user interface options for presenting payment coupon scanning functionality to a payer 110 may be provided, and that the aforementioned examples and illustrations are provided for illustrative purposes and are not intended to be limiting.

Following block 305 is block 310, in which the payer 110 may select the option to scan a payment coupon, which is received by the payment service provider system 105 at block 315. After receiving the selected option to scan a payment coupon, operations continue to block 320, in which control of the scanner device 120 in communication with the payer's computer 115 is invoked, according to one embodiment. As described above, control of the scanner device 120 may be accomplished by any number of methods, including, but not limited to, an applet or other local application component downloaded for local execution on the computer 115 or a webpage-based operation executed from within the web browser/webpage. As part of invoking control of the scanner device 120, an application may include logic to perform one or more of the following scanner device identification functions: identify all available scanner devices, present the user with an option to select a scanner device, assume a default scanner device, identify a current default scanner device, and/or activate the scanner device. After identifying the scanner device 120 to be utilized, the application may continue to access and issue control commands to the scanner via a locally installed scanner driver. In one embodiment in which the previously indicated default scanner device is utilized or a default scanner device is assumed, control of the scanner functionality may not be needed until blocks 330-340 are performed, where actual scanning and transmitting are performed. Moreover, in another embodiment, the payment coupon imaging application may not control, activate, or otherwise interact with the scanner device, such as if the activation and control are manually provided by the payer (e.g., at block 330), including subsequently inputting to the payment coupon imaging application a memory location for one or more files containing a scanned payment coupon image.

Following block 320 is block 325, in which instructions on how to perform payment coupon scanning may be presented to the payer 110. According to various embodiments, the instructions may be presented by transmitting a separate webpage to the computer 115 or by presenting an applet or other window from the same webpage presently being viewed. Any number of payment coupon scanning instructions may be presented to the payer 110, depending upon the particular implementation.

For example, according to some embodiments, the payment coupon scanning instructions may request that the payer 110 physically separate the payment coupon from other bill information present on the paper containing the payment coupon and/or that the payer 110 orient the payment coupon within the scanner device 120 in a particular manner. For example, payment coupon scanning instructions may request that a certain edge (e.g., the top, etc.) be aligned with a certain area of the scanner device 120 (e.g., along the top edge of a scanner screen, along the left side of a scanner feed tray, etc.) to facilitate determining image orientation and subsequent processing by the payment service provider system 105. In another example, such as if the scanner device 120 is a hand or wand scanner, the instructions may indicate a direction of scanning relative to a particular orientation of the payment coupon and/or an edge from which scanning is to begin. It is appreciated that other payment coupon orientation instructions may be provided as desired. Moreover, in some embodiments, the payment coupon scanning instructions may indicate that the coupon is to be separated from the paper on which it is displayed but may not provide any particular payment coupon orientation instructions.

In other embodiments, the payment coupon scanning instructions may contain instructions permitting the payer 110 to scan the entire page on which the payment coupon is displayed. In this example embodiment, additional orientation instructions may not be needed, because the payment coupon would typically be embodied in a standard page size for which orientation is conventionally understood (e.g., 8.5 inches by 11 inches, etc.). Although, in some embodiments, even if scanning a standard page size, additional orientation instructions, such as those presented when separating the payment coupon from the rest of the page, may also be presented.

In an embodiment in which an entire page is scanned and no orientation instructions are presented, the payment service provider system 105, such as the coupon scanning module 180, may perform some additional processing of the received payment coupon image to identify and isolate the payment coupon portion. Various processing operations may be performed based on certain assumptions of typical payment coupon layouts and/or data identified using optical character recognition ("OCR") techniques. For example, in one embodiment, processing operations may assume that a payment coupon is always located at either the top or the bottom of a page along its shortest dimension (e.g., along the 8.5 inch dimension for 8.5 inch by 11 inch pages, etc.). Thus, OCR processing may be performed to identify one or more separator tokens or other indicators displayed on the scanned image (e.g., a separator line of dashes, a scissors symbol, a text string such as "detach here," etc.) to isolate the payment coupon portion from the remainder of the page. In other embodiments, other combinations of identified information (e.g., using OCR) and assumptions may be used, such as, but not limited to, identifying what appears to be a biller name, a payer name, an account number, a bar code, etc., and determining the orientation and approximate size of the payment coupon image based on assumptions of known or standard coupon layouts (e.g., where billers are traditionally identified, where payers are traditionally identified, barcode locations, etc.). In some situations, there may not be any means to identify and isolate the payment coupon from the rest of the page based on the received payment coupon image. In these situations, the payment service provider system 105 may respond to the payer 110 (during subsequent processing as described with reference to FIG. 5) with a request for an explicit identification of the payment coupon layout, with a rejection indicating the scanned image cannot be utilized for processing, with any and/or all information obtained from the payment coupon image (e.g., from OCR processing) for identification as to what each piece of information represents, and the like.

According to one embodiment, payment coupon scanning instructions presented to the payer 110 at block 325 may be presented textually (e.g., step-by-step instructions, etc.) or graphically. Graphically presented payment coupon scanning instructions may include a representation of a scanned coupon and/or its placement within a scanner device 120.

According to one embodiment, if the payment coupon imaging application is configured to allow for more than one method for scanning a payment coupon (e.g., allow for separated payment coupons and for entire page scans, etc.), then the instructions presented may allow the payer 110 to select which scanning method is to be utilized, and will thus tailor any subsequent instructions presented to the payer 110 as well as subsequent image processing performed by the payment service provider system 105. In other embodiments, the local or server processing may determine which scanning option was performed based on the dimension and/or shape of the scanned payment coupon image. For example, if the received payment coupon image has a shape or dimension other than standard paper sizes, it may be assumed that the coupon was separated from the page on which it was originally presented before being scanned, thus indicating that the entire received image likely represents the payment coupon. Otherwise, if the scanned image received is the same or similar to a standard paper size, then it may be assumed that the payment coupon was not first separated from the page on which it was presented, and that additional processing may be required to identify and isolate the portion representing the payment coupon.

Figure 6B:

Following block 325 are blocks 330-335, in which the payer 110 (or the payment coupon imaging application) may activate the scanner device 120, at block 330, and scans a payment coupon, at block 335, according to the payment coupon scanning instructions presented. In one embodiment, upon scanning, a scanned payment coupon image may be stored locally within the memory of the computer 115 or the scanner device 120, such as for performing subsequent processing prior to transmitting the payment coupon image to the payment service provider system 105. FIG. 6B illustrates an example user interface 610 showing a scanned payment coupon image displayed to a payer 110 prior to transmission to the payment service provider system 105. In response to viewing the scanned payment coupon image, the payer 110 may then instruct transmission of the payment coupon image to the payment service provider system 105 at block 340. It is appreciated, however, that in some embodiments, a preview screen, such as the example user interface 610 illustrated in FIG. 6B, may not be presented, and the payment coupon imaging application may cause the scanned payment coupon image to be transmitted immediately in response to the payer's 110 instructions.

Upon receiving the scanned payment coupon image at block 345, the payment service provider system 105 may then proceed to process the image, such as is described with reference to FIGS. 4A-4B, for example. After receiving the payment coupon image, the method 300 may end, having enabled a payer 110 to utilize a computer 115 and a scanner device 120 to capture payment coupon information from a bill, which may be used to capture biller information, add the biller to the payer's list of billers, and/or to process a payment for the scanned payment coupon.

Figure 7A:
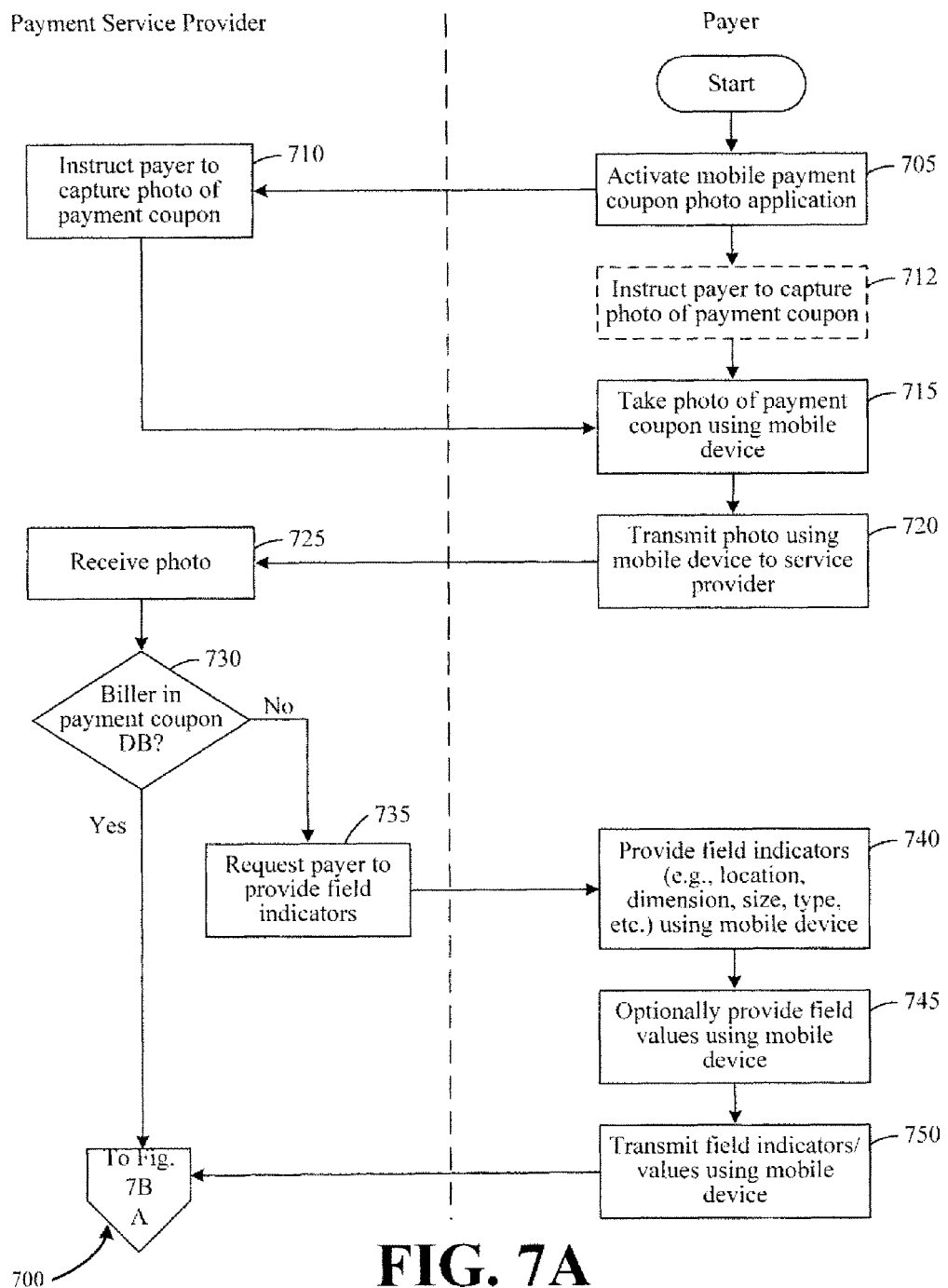
FIGS. 7A-7B illustrate a flow diagram of an example method for taking a photograph of a payment coupon, according to an example embodiment of the invention.
Figure 7B:
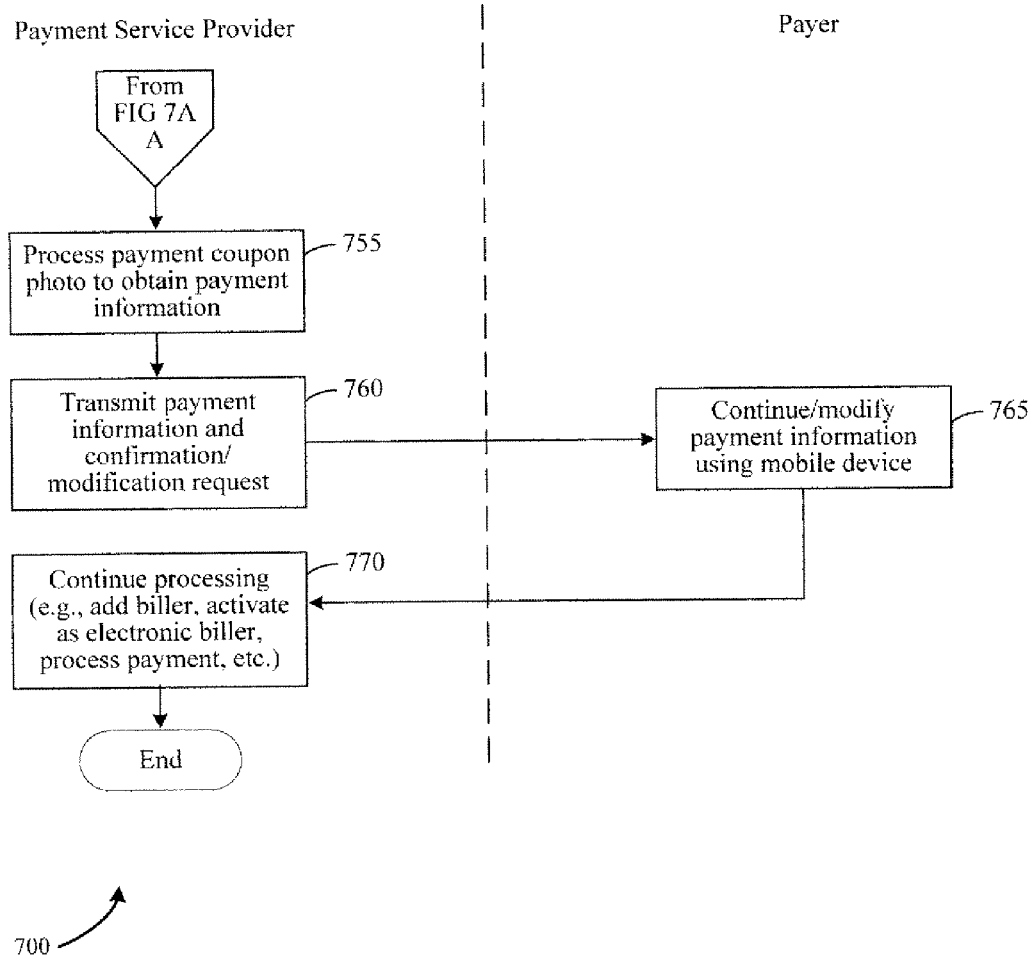
Figure 9:
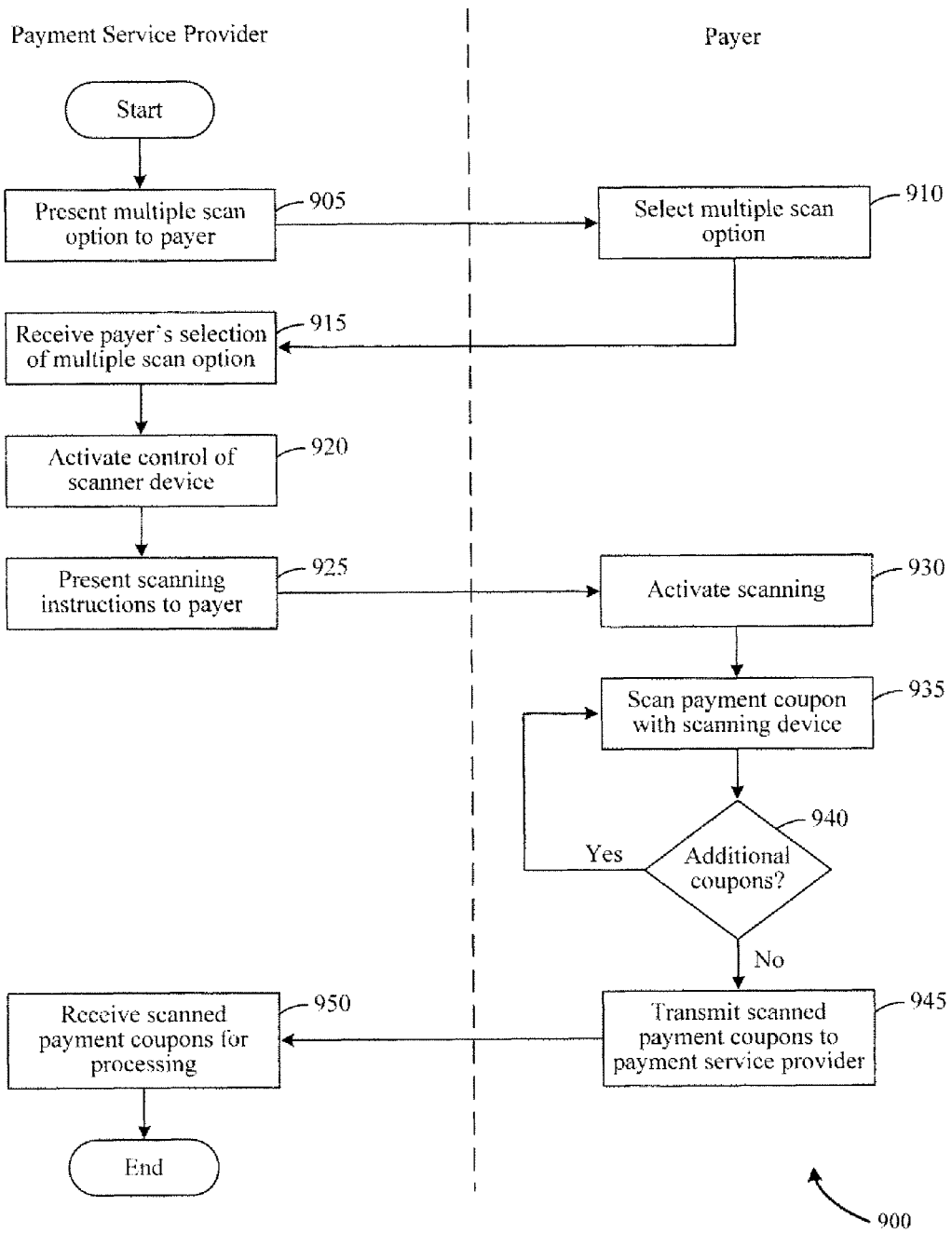
FIG. 9 illustrates a flow diagram of an example method for scanning multiple payment coupons, according to an example embodiment of the invention.

While the method 300 described with reference to FIG. 3 relates to scanning a payment coupon utilizing a computer 115 and a scanner device 120, FIGS. 7A-7B illustrate an example method for capturing a digital photograph of a payment coupon utilizing a mobile device 125, as described in detail below. In addition, FIG. 9 illustrates an example method for scanning multiple payment coupons utilizing a computer 115 and a scanner device 120 in a manner similar to the method 300, as described in detail below.

Figure 4A:
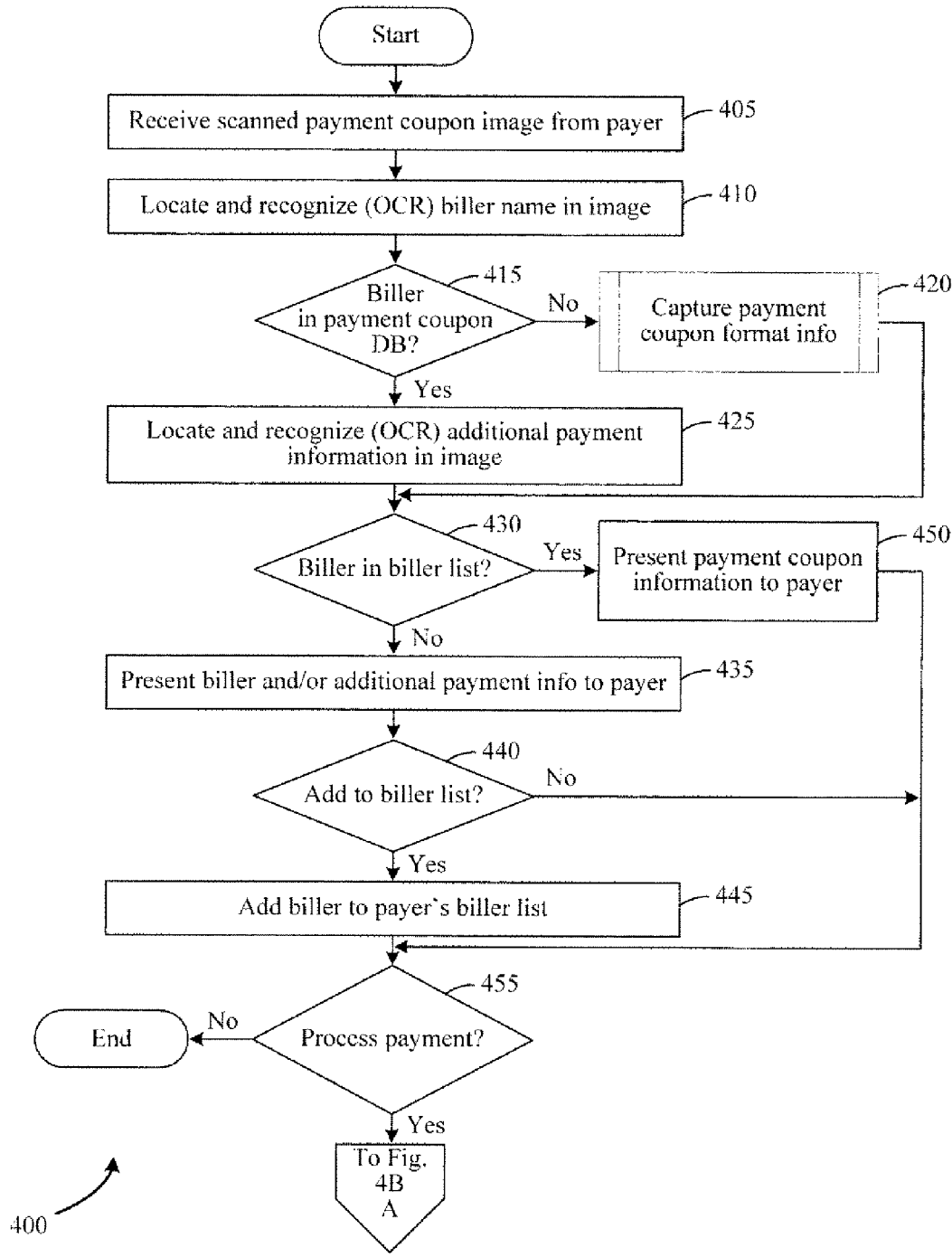
FIGS. 4A-4B illustrate a flow diagram of an example method for determining and processing payment coupon information from a payment coupon image, according to an example embodiment of the invention.
Figure 4B:
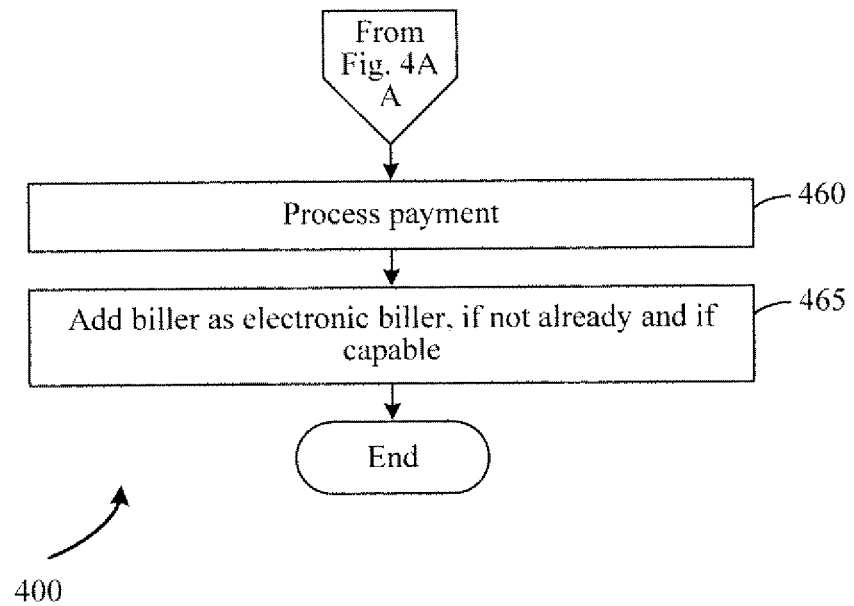

FIGS. 4A-4B represent a flow diagram of an example method 400 for processing a payment coupon image transmitted by a payer, according to one embodiment. In example embodiments, certain operations of the method 400 may be performed by one or more payment service provider computers associated with a payment service provider system, such as the payment service provider computers 160 associated with the payment service provider system 105 described with reference to FIG. 1. Example processing may be performed by one or more software application modules of the payment service provider system, such as the coupon image module 180 described with reference to FIG. 1, and may perform operations such as, but not limited to, capturing payment coupon metadata or other information, adding a biller to a payer's biller list, activating a biller as an electronic biller, and/or processing a payment request corresponding to the received payment coupon image. However, in other embodiments, certain operations of the method 400 may be performed by one or more other components, such as by one or more suitable financial institution systems and/or by a payer's device, such as by a mobile device 125 performing local processing, instead of, or in addition to, the operations performed by the payment service provider system.

The method 400 may begin at block 405. At block 405, the payment service provider system 105 may receive a scanned payment coupon image from a payer device, such as is described with reference to FIG. 3. As discussed, the payment coupon image may represent only the payment coupon, such as if the payer 110 separated the payment coupon from the page on which it is displayed, or it may represent an entire page containing a payment coupon and other immaterial information. As discussed with reference to FIG. 3, additional processing may optionally be performed to first identify and isolate the payment coupon from an immaterial portion of the image if it is determined that the image received represents more than the payment coupon (e.g., if the payment coupon was not separated from the rest of the page). Details of example operations to identify and isolate the payment coupon are described in more detail with reference to block 320 of FIG. 3.

Following block 405 is block 410, in which the payment service provider system 105 may locate a biller name or other biller identifier from the image received, such as via OCR processing performed on the image. One or more OCR modules can be utilized to perform OCR processing in combination with processing logic based on known layouts of payment coupons. For example, known locations or approximate locations of biller information may be included in the processing logic to more effectively direct OCR processing to the likely location within the image to contain biller information. For example, payment coupons are typically one of two types. In a first type, payment coupons contain the biller name and address (and/or other biller information) at a location that is intended to be visible through a transparent envelope window. For payment coupons of the first type, the location of the biller name and address (and/or other biller information) can be relatively predictable and defined through various manners, such as at a particular distance from one or more edges of the payment coupon, or at or near approximate x and y coordinates, etc. Payment coupons of a second type are intended for placement in an opaque envelope with the biller name and address preprinted or otherwise contained on the envelope. In these cases, the location of the biller name and address (and/or other biller information) is less predictable. However, in one embodiment, an analysis of a set of known payment coupons can be performed to identify likely locations, notwithstanding the payment coupon type.

For example, in one embodiment, biller information can by located by first establishing a predefined rectangle (or other geometry) having dimensions that will encompass a majority of biller information areas on payment coupons, which may be defined based on experience and/or an analysis of known payment coupons. OCR processing can then be performed on the payment coupon image at a first location within the image defined by the rectangle (or other geometry). If no identifiable characters and/or if "noise" are identified by the OCR processing, it may be determined that this first location does not contain the biller information and subsequent locations (which may optionally be overlapping) are similarly processed. The first location for the rectangle (or other geometry) area may be decided based on the likelihood of biller information location on payment coupons, such as to try the area with the greatest likelihood first. In another embodiment, the first location for the rectangle and/or the rectangle dimensions may be based at least in part on known billers for the payer 110 (or other transaction trends) that may suggest a certain location for biller information. It is appreciated that any other analytic technique may be used, based on known information about billers, payers, and/or payment coupon layouts, to define the dimension and shape of the rectangle (or other geometry) area and the location for performing OCR processing. If, however, the first area (or any other subsequent area) processed using OCR does appear to include biller information, additional verification processing may be performed. For example, the OCR processing results may be analyzed to identify text values that would indicate confirmation that the text string is a biller name (e.g., strings including "Company," "Inc.," etc.), or that the results identify text values that indicate the information is not a biller name (or other identifier), such as, but not limited to, text values indicating an address (e.g., strings including road name components like "Rd.," "St.," PO box designations, states, zip codes, etc.) or payment information (e.g., strings with a significant number to character ratio, "$," etc.). If the results do not appear to indicate a biller name, then OCR processing may be performed on a different location. Otherwise, it may be assumed that the biller name is captured if the OCR processing does indicate at least some text string.

In one embodiment, if no biller information is discernable from the payment coupon image, the payment service provider system 105 may transmit an indication to the payer 110 (e.g., as a webpage or other presentation) that the biller information was not identified and request that the payer 110 enter the biller information. However, in other embodiments, the operations of requesting biller information may be performed in the same or similar manner as the operations requesting the payer 110 to identify and capture additional payment coupon information, such as at block 420 and as described in more detail with reference to FIG. 5.

Following block 410 is decision block 415, in which the payment service provider system 105 may compare the biller information obtained from the payment coupon image via the OCR processing at block 410 to stored payment coupon metadata, such as may be stored in the payment coupon database 170 described with reference to FIG. 1. The payment coupon database 170 may contain payment coupon metadata and/or other payment coupon information to indicate the payment coupon layout and to facilitate obtaining elements from biller payment coupon images. The payment coupon metadata may indicate, based on a biller and/or a payment coupon type, a general layout of different payment coupons, which may include, but is not limited to, payment coupon dimensions, payment coupon shape, relative location of payment coupon data (e.g., biller information, payer information, account information, billed amount information, date due information, etc.), field formats, field value limitations or other rules, etc. In addition, the payment coupon database 170 may further include information regarding types of billers (e.g., managed payees, unmanaged payees, electronic billers, etc.) and/or information regarding payers (e.g., payer preferences, account limitations, etc.), as well as an association between the biller and/or payer entries in the payment coupon database 170 and other databases or stored information maintained by the payment service provider system 105, such as, but not limited to, a managed payee database, a payer database, a financial institution database, and the like. It is appreciated that the payment coupon database 170 (and/or any other stored information) may include any suitable information that may be utilized to facilitate processing received payment coupon images, as well as processing add biller requests, activate electronic biller requests, payment requests, and the like, and is not to be limited by the aforementioned illustrative examples.

Accordingly, by determining whether payment coupon metadata already exists for the biller identified, it may be determined whether the layout of the payment coupon is known or whether layout information is to be gathered from the payer 110. A biller match may be determined according to any number of methods, including, but not limited to, an exact match of the biller name (or other identifier) obtained through OCR processing to an authoritative biller name stored, an exact match of the biller name obtained through OCR processing to one of possibly a number of biller name aliases stored, or a match of a variant of the biller name to either an authoritative name or an alias stored. For example, variants or aliases may be formed by expanding or contracting name elements, or specifying commonly used or known alternative forms.

If at decision block 415 it may be determined that the biller name obtained from the payment coupon image is not already associated with payment coupon metadata stored in the payment coupon database 170, then operations continue at block 420 to capture payment coupon information from the payer 110, which is described in more detail with reference to FIG. 5. For example, the image of the payment coupon may be re-presented to the payer 110 via the payment coupon imaging application, which allows the payer 110 to provide one or more field indicators that may indicate location, dimension, content, value, etc., of one or more payment coupon fields. Payment coupon fields for which field indicators are captured may include, but are not limited to, biller address, payer account number, payment amount, payment date, due date, biller phone number, and the like. After payment coupon information is provided by the payer 110 at block 420, operations continue at block 430 described below.

However, if at decision block 415 it is determined that payment coupon metadata does exist for the biller identified on the payment coupon, then block 425 follows. At block 425, the payment service provider system 105 may proceed to obtain additional payment information from the payment coupon image utilizing OCR processing and the known payment coupon layout provided by the payment coupon metadata for payment coupons by this biller. For example, OCR processing may be used to identify certain fields and field values needed to perform subsequent processing. Subsequent processing may include, but is not limited to, adding the biller to the payer's biller list of approved billers, activating the biller as an electronic biller, and/or processing a payment associated with the received payment coupon. Fields that may be used during subsequent processing may include, but are not limited to, biller address, payer account number, payment due date, bill date, payment amount due, and the like.

For example, in one embodiment, biller address information may be determined by OCR processing performed on the payment coupon image based on the biller address location and/or field size indicated by the payment coupon metadata for the biller. However, in another example, biller address information may already be known, such as if it is already stored by the payment service provider system 105 (e.g., in the payment coupon database 170 or other memory) or if the biller is a managed payee for which address information is not required. Thus, in these instances, the biller address information may be captured and stored (e.g., adding the biller address to a list of known biller addresses, etc.), or it may be ignored, choosing to rely on the previously stored biller address information.

In another example, payer account information contained in an alphanumeric string may be determined from the payment coupon image by OCR processing. However, in other embodiments, a payment coupon may display account information in a barcode, which may be analyzed according to a known barcode standard which the payment service provider system 105 is operable to decipher.

In yet another example embodiment, prior to obtaining payment coupon information from the image, the payment service provider system 105 may first determine whether more than one type of payment coupon exists for the identified biller. If the payment coupon database does include multiple payment coupon types for the identified biller, additional processing of the payment coupon image may be performed to determine which of the known payment coupon types the scanned image represents. For example, each payment coupon type may have a different shape and/or dimension, or may have a different biller or payer information location. Thus, OCR processing can be performed on the received payment coupon image to determine, for example, an approximate shape and/or dimension of the payment coupon, or an approximate location of the biller or payer information, which may allow proper identification of the type of payment coupon the scanned image represents. Knowing proper layout will, in turn, permit more accurate OCR processing of the payment coupon image as described above. In some instances, payment coupon metadata for the exact type of payment coupon received at block 405 may not be stored, even though some payment coupon metadata is stored for the identified biller. In these cases, the payment service provider system 105 may subsequently request payment coupon information at block 420.

Following block 425, or block 420 if the payer provided additional payment coupon information, is decision block 430. At decision block 430, according to one embodiment, the payment service provider system 105 determines whether the biller associated with the payment coupon is already associated with the payer 110 as an approved biller. For example, a biller list (also referred to interchangeably as a "payee list") may be maintained for each payer 110 as a list of billers to which the payer may frequently provide payment or otherwise transact, thus simplifying the transaction experience by the payer, allowing billers to be easily displayed and selected, by already storing the proper biller information and the payer's account number with the biller. Accordingly, at decision block 430, the biller's name or variant thereof, and/or any other biller identifying information, may be compared to the payer's biller list. It is appreciated that additional information may be used to facilitate determining a match, such as address information, account information, or other stored authoritative information (e.g., if a managed payee, etc.).

If it is determined that the biller is already associated with the payer's biller list, then operations proceed to block 450 for displaying payment information to the payer in a manner similar to that described below with reference to block 435, after which decision block 455 is performed. At decision block 455, a determination can be made as to whether any additional processing is to be performed, such as to process a payment request and/or to add the biller as an electronic biller.

However, if it is determined at decision block 430 that the biller is not already associated with the payer's biller list, then the payment service provider system 105 may present to the payer 110 the biller information at block 435. For example, a webpage or other user interface may be presented that includes, but is not limited to, one or more of the following: the coupon image, the biller name, a payment amount, a payment date, and the like. Moreover, in some embodiments, one or more of the payment coupon fields presented can be modifiable by the payer 110, such as, but not limited to, the payment amount or the payment date. The biller name does not need to be modifiable because it was already matched to existing payment coupon metadata stored in the payment coupon database; although, in some embodiments, it may be associated with an option to allow changing the biller in the event there is an incorrect match (e.g., a hyperlink, one or more entry fields, etc.). The payment date initially displayed may be a payment processing date different than, but based on, the payment coupon's due date or it may be the due date itself In some embodiments, the payment date may take into account a payment processing calendar or timeline to facilitate determining and, optionally presenting, an earliest possible processing or delivery date or any other strategically determined payment date. It is appreciated that, according to various embodiments, biller and/or payment information may be modified by the payer 110 at this stage, or may be modified during subsequent operations, such as are described with reference to block 455 and FIG. 6C, for example.

In addition to payment coupon information, an option to add the biller to the payer's biller list may be presented to the payer 110. For example, the option may be presented as a separate webpage (or other interface, such as within another webpage) providing the biller information and an ability to add the biller to the biller list. In other embodiments, the option may be presented in conjunction with other processing, such as when processing a payment request to the biller. At decision block 440 it is determined whether the biller is to be added to the payer's biller list. If so, then block 445 follows in which the biller is added. If not, then operations continue to decision block 455 to determine whether additional processing is to be performed. In one embodiment, it may be presumed that if payment request is being processed the biller is to be added to the biller list, and may optionally be required to be added before processing a payment request. In these embodiments, the operations at blocks 440 and 445 may naturally flow from, or otherwise be processed during, processing a payment request. In other embodiments, however, a payer 110 may be presented with the option to explicitly request the biller be added to the payer's biller list.

At decision block 455, it may be determined whether a payment is to be processed in addition to adding the biller to the payer's biller list (if not already associated therewith). According to one embodiment, if a payment is not to be processed, operations end after decision block 455, as shown in FIG. 4A. However, in other embodiments, additional processing may be performed, such as to determine whether the biller can be activated as an electronic biller for the payer 110, as described at block 465. In some embodiments, a payment may not be processed in response to receiving a payment coupon image from a payer 110, such as if the payer 110 is utilizing the payment coupon scanning functionality only to add the biller to the payer's list of billers. However, in other embodiments, processing a payment may naturally follow the transmission of a payment coupon image. In some embodiments, it may be presumed that a payment will be processed upon receiving and processing a payment coupon image, such that the next presentation to the user may include both the payment coupon information and an option to request payment processing.

An example of a presentation containing both payment coupon information and an option to request payment is illustrated by the user interface 615 of FIG. 6C. As one example, FIG. 6C illustrates an example user interface 615 in which payment coupon information and payment details are presented to the payer 110 along with an option to proceed with paying the bill. In one embodiment, one or more of the fields presenting payment coupon information and/or payment details may be modifiable by the user, such as may be provided for the payment to be processed. For example, a payment amount and/or payment may be entered or updated by the payer 110; though, it may be entered at another stage in the processing in other embodiments. It is appreciated that any number of user interface options for presenting biller information and payment detail to a payer 110 may be provided, and that the aforementioned example is provided for illustrative purposes and is not intended to be limiting.

Accordingly, if it is determined at decision block 455 that a payment is to be processed, then operations continue to block 460 of FIG. 4B in which the payment is processed. According to one embodiment, when issuing a command to process a payment, the payer 110 may have the ability to modify one or more payment field values. For example, the user interface 615 illustrated by FIG. 6C permits the payer 110 to modify any of the field values, including, but not limited to, biller name, biller address information, payer's account information, amount due, date due, and payment date. However, in other embodiments, only limited field values may be altered by the payer 110, such as a payment amount (not shown in FIG. 6C) and/or a payment date. Furthermore, in response to receiving the command to process a payment, the payment service provider system 105 may additionally transmit a confirmation request to the payer 110 prior to processing the payment with the biller. A confirmation request may present the final field values to the payer 110, to which the payer 110 may respond by confirming, optionally modifying the values again, or cancelling the payment request. The example user interface 620 illustrated by FIG. 6D represents a confirmation window that may be presented to the payer 110 that includes pertinent payment information. After receiving confirmation by the payer 110 (or automatically, in some embodiments), the payment service provider system 105 may proceed to process a payment to the biller in response to the payment request via any one or more of a number of mechanisms available, such as by delivering a paper instrument to the biller, delivering paper remittance advice to the biller, delivering an electronic image of a paper instrument to the biller system 130, delivering electronic remittance advice to the biller system 130, directing an electronic credit to a biller's account at the biller financial institution system 135, or directing an electronic debit to the payer's account at the payer financial institution system 140.

After processing a payment, operations may continue at block 465. At block 465, the payment service provider system 105 may determine whether the biller supports electronic billing and, if so, activates the biller as an electronic biller of the payer 110 if requested to do so. An electronic biller allows paperless bill delivery to the payer 110 electronically (e.g., via email, via a website, etc.) instead of, or in addition to, receiving a paper bill with a payment coupon attached. Accordingly, the operations of the method 400 may be utilized by a payer 110 to convert a biller from issuing paper bills to delivering electronic bills. It is possible that not all billers have the ability or are otherwise unable to provide electronic billing, and thus cannot be activated as an electronic biller. In one embodiment, the payment service provider system 105 maintains stored information identifying the capabilities of billers and/or providing a list of known billers capable of electronic billing. If capable, at block 465, the payment service provider system 105 may present the option to the payer 110 (e.g., via a separate webpage or other interface presented from the webpage already being presented) to activate the biller as an electronic biller.

Figure 6E:
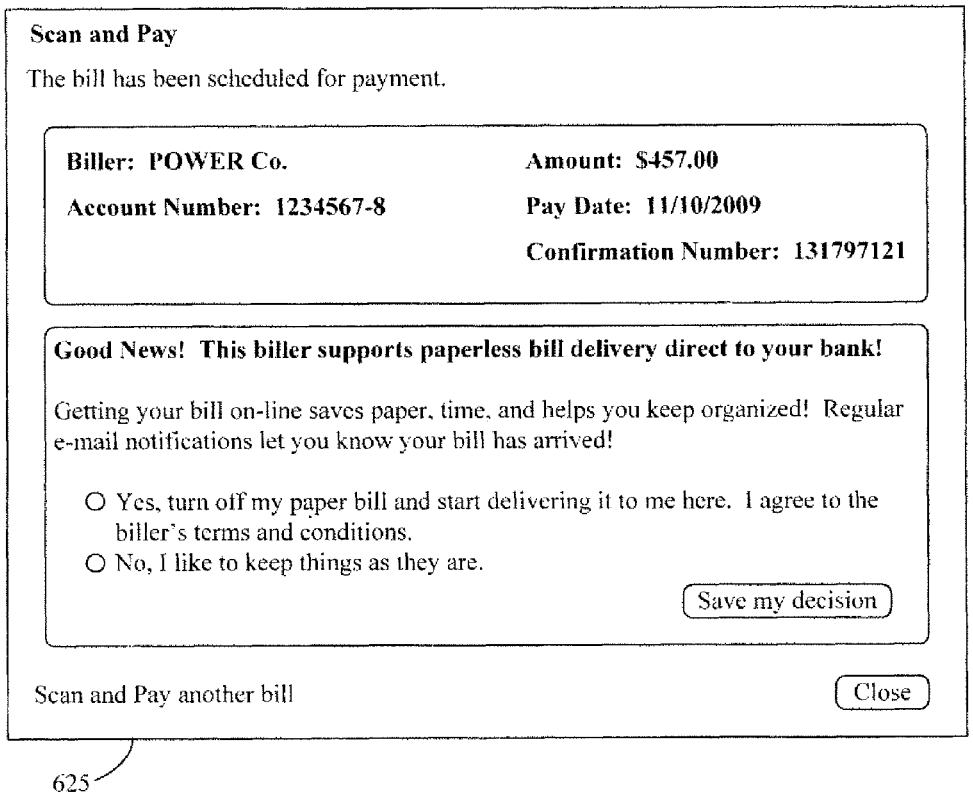

FIG. 6E illustrates an example user interface 625 that presents an option to the payer 110 to activate the biller as an electronic biller for the payer 110. In this example, the user interface 625 presents the option to activate the biller as an electronic biller with a confirmation that the payment has been scheduled. It is appreciated that any number of user interface options for presenting an option to convert a biller to an electronic biller may be provided, and that the aforementioned example is provided for illustrative purposes and is not intended to be limiting.

The method 400 may end after block 465 or 455, having received a scanned payment coupon image from a payer 110 and performed OCR processing of the image to identify the biller, to optionally gather additional payment coupon information to update payment coupon metadata, to optionally add the biller to the payer's biller list, to process a payment corresponding to the payment coupon, and/or to activate the biller as an electronic biller for the payer 110.

It is appreciated that the described operations of the method 400 are provided for illustrative purposes, and that additional operations may be performed, less than all operations described may be performed, and/or alternative operations may be performed. For example, in another embodiment, instead of requesting the payer 110 to indicate payment coupon layout information at block 420, another entity may perform these operations, such as an individual associated with the payment service provider, the biller, or a third-party entity. In one example of this embodiment, rather than wait for the other entity to manually identify the payment coupon layout, the payment service provider system 105 may instead instruct the payer 110 that the layout is unknown and request that payment be processed in another manner.

Figure 5:
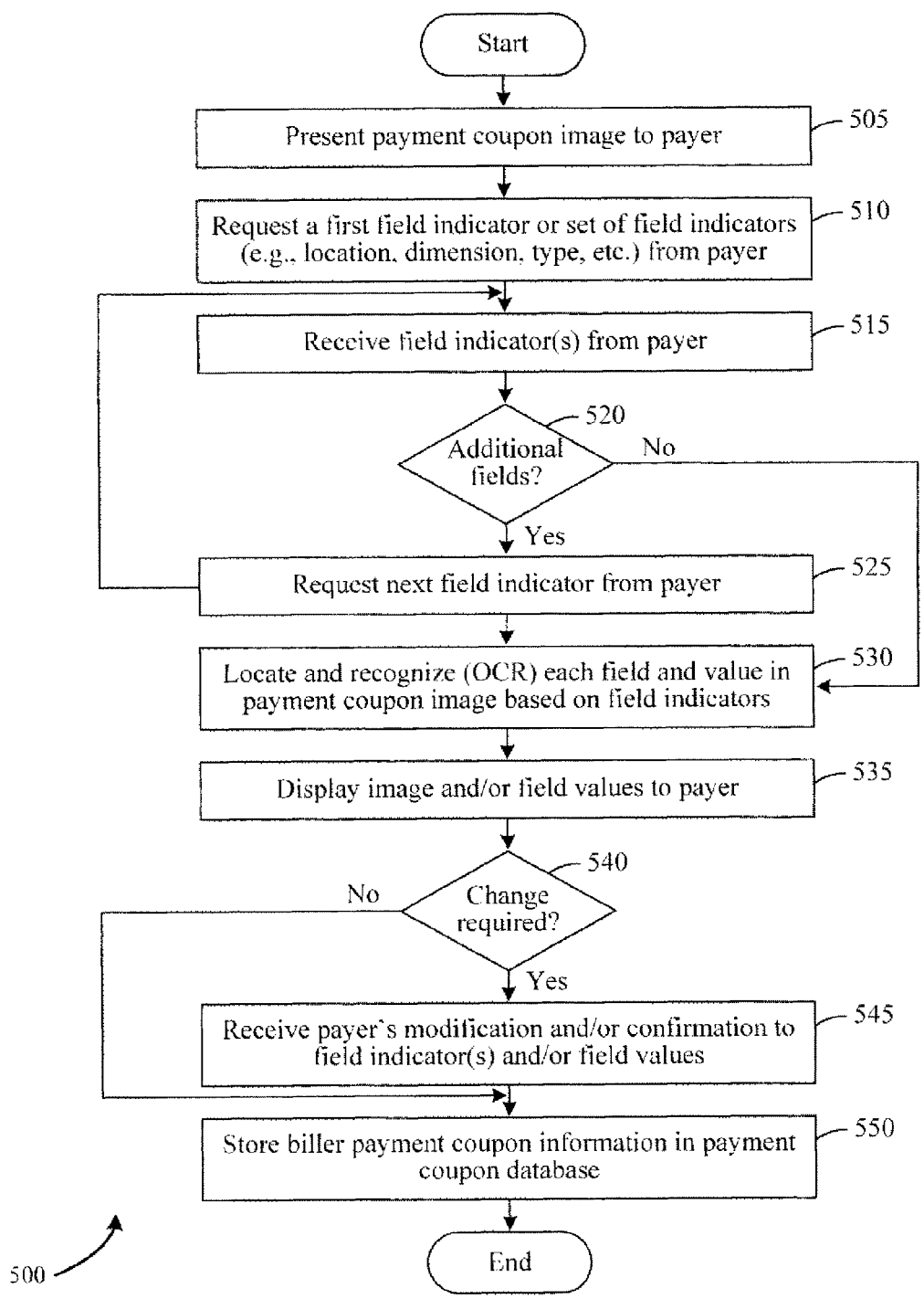
FIG. 5 illustrates a flow chart of an example method for capturing payment coupon information, according to an example embodiment of the invention.

FIG. 5 represents a flow diagram of an example method 500 for capturing layout information for a payment coupon image transmitted by a payer, according to one embodiment. For example, the operations of the method 500 may be performed when payment coupon image metadata does not already exist for the payment coupon's biller and/or payment coupon type, such as would occur at block 420 of FIG. 4A described above. In response, the payer 110 may utilize a unique user interface for identifying location, dimension, content, and value, of one or more payment coupon fields. The payment coupon layout information collected from the payer 110 can be added to, or be used to update, the payment coupon metadata for the biller, permitting more efficient processing of subsequent payment coupon images from the biller and/or of the same type.

Accordingly, in example embodiments, the operations of the method 500 may be performed by one or more payment service provider computers associated with a payment service provider system, such as the payment service provider computers 160 associated with the payment service provider system 105 described with reference to FIG. 1. Example processing may be performed by one or more software application modules of the payment service provider system, such as the coupon image module 180 described with reference to FIG. 1. These operations may be performed while interacting with a payer's device, such as a computer 115 described with reference to FIG. 1. However, in other embodiments, certain operations of the method 500 may be performed by one or more other components, such as by one or more suitable financial institution systems and/or by a payer's device, such as by a mobile device 125 performing local processing, instead of, or in addition to, the operations performed by the payment service provider system.

The method 500 may begin at block 505, in which a payment coupon image that was previously scanned and transmitted to the payment service provider system 105 may be re-presented to the payer 110. Re-presentment of a payment coupon image to a payer 110 would occur after it is determined that the payment coupon metadata does not contain metadata specific to the received payment coupon type (e.g., no payment coupon metadata associated with the identified biller), such as is described with reference to blocks 415 and 420 of FIG. 4A. Accordingly, when re-presenting the payment coupon image to the payer 110, instructions are provided to the payer 110 to identify the layout of the payment coupon information and information regarding one or more payment coupon fields. Payment coupon layout information may be provided by field indicators, which generally refer to information that indicates the layout of the payment coupon, field locations, field type, and/or content. According to various embodiments, field indicators may include, but are not limited to, approximate locations, sizes, and/or dimensions of various fields; field types; or field values. The example user interface 630 illustrated by FIG. 6F represents a payment coupon image presented to a payer 110 with a request to provide field indicators, including the location of the biller address, the account number, the amount due, the date due, and the balance. It is appreciated that any number of user interface options for re-presenting a payment coupon image to a payer 110 and requesting field indicators may be provided, and that these examples and illustrations are provided for illustrative purposes and are not intended to be limiting.

At block 510, the payment service provider system 105 may present instructions requesting a first field indicator from the payer 110. The instructions may request a field indicator for any of a number of fields for which payment coupon metadata is to be captured and stored by the payment service provider system 105, including, but not limited to, biller name (or other identifier), such as if the biller name is incorrect or not previously identified; biller address (e.g., street, city, state, zip, etc.); payer account number with the biller; payment amount; amount due; payment date; or due date. A number of techniques may be provided for the payer 110 to indicate the field identifier graphically on the image of the payment coupon being re-presented.

For example, in one embodiment, the payer 110 may drag, using a mouse or other input device, a box (or other geometry) or border indicating a specific field type over the approximate location of the respective field on the image and size the box (e.g., by dragging a corner to alter the dimensions) to approximately encompass the field. For example, with reference to the user interface 630 of FIG. 6F, each box, the biller address box, the account number box, the amount due box, the date due box, and the balance box, identifies a field over which the box is to be placed. By positioning, and optionally re-sizing, a box over a respective field, the application can determine a representative location, and optionally dimensions, of the field within the image by determining the location of the positioned box within the image. In some embodiments, the box may be approximately the same size and shape of the field, such that the payer 110 need not re-size the box.

In another embodiment, the payer 110 may be instructed to click, using a mouse or other input device, on or near a first corner of the respective field on the image and subsequently click on or near a second corner that is diametrically opposite the first corner, indicating the approximate location of a diagonal formed across the field. Another variation of this technique may include the payer using a mouse or other input device to trace the approximate shape of a respective field or to drag the mouse pointer to form a rectangular shape that is approximately the same size and location of the field.

In yet other embodiments, the payer 110 may be instructed to click on other portions within or near a respective field on the image, such as, but not limited to, the approximate center of the field, four corners of the field, two opposing sides of the field (e.g., representing the width or the height), all sides of the field (e.g., representing the width and height), and the like. In one embodiment, in response to the payer's 110 input, the presentation may display visual cues or other indications of the location(s) or area(s) identified by the payer, which may permit modification or adjustment by the payer 110 prior to submission.

In response to the payer's 110 input identifying a field location and/or dimensions, the payment service provider system 105 can thus determine the approximate location of the respective field within the instant payment coupons and other payment coupons of that same type. The underlying data associated with a field indicator may be generated in a number of ways, including, but not limited to, one or more x and y coordinate pairs indicating an approximate location of the respective field within the image (e.g., an x and y coordinate pair representing corners, side edges, top and bottom edges, and/or centers, etc.), one or more horizontal or width dimensions, one or more vertical or height dimensions, dimensions of a rectangle (or other geometry), one or more distances from one or more predefined locations within the image (e.g., a distance from the center or a distance from a specific corner, etc.), and the like. It is appreciated that the aforementioned examples of data representing a field indicator are provided for illustrative purposes, and that any other suitable location and/or size measurement may be provided.

Moreover, in some embodiments, the field indicator may further include an indication of the field type. For example, the field indicator may identify that the field is one of: a biller name field, a biller address field, an account number field, a payment amount field, an amount due field, a due date field, a payment date field, and the like. Field types may be entered by the payer 110 (e.g., through a text input field or a dropdown field, etc.), or they may already be associated with the respective field indicator input, such as if the instructions dictate which field is being identified or if a box or other shape being positioned and sized over a field is associated with a specific field type.

In some embodiments, the field indicator may further include one or more field values indicated in the instant payment coupon for the respective field. This may optionally be performed by the payer 110 at the time of generating the field indicator, such as to avoid modifying a field value later or to add or alter a field value (e.g., to add a payment date or to alter a payment amount, etc.). However, in other embodiments, the payment service provider system 105 may subsequently process each field location identified by the field indicators received using OCR processing to determine respective field values, as described with reference to block 530 below.

Accordingly, after entry of a field indicator by the payer 110, the field indicator value or values may be transmitted to the payment service provider system 105 at block 515. Following block 515 is decision block 520, in which it may be determined whether there are additional fields for which field indicators are to be gathered from the payer 110. For example, in one embodiment, field indicators are individually transmitted from the payer 110 to the payment service provider system 105 one at a time for processing individually upon receipt, or for subsequent cumulative processing after receipt of all field indicators. If additional field indicators are to be provided by the payer 110, operations continue to block 525, in which the payer 110 may be instructed to enter the next field indicator value in the same or similar manner as described with reference to blocks 510-515. However, in other embodiments, the payer 110 may provide field indicators for multiple fields of the payment coupon image at once, such that the operations of blocks 510-525 are performed together.

After receipt of all field indicators, operations continue to block 530, in which the payment service provider system 105 may perform OCR processing on the payment coupon image to capture field values for each field based at least in part on the respective field indicator information received for each field. After capturing field values, the payment service provider system 105 may present one or more of the field values to the payer 110 for review, confirmation, and/or modification at block 535. The image of the payment coupon may also optionally be presented to the payer 110 at the same time (e.g., within the same webpage, applet, or other interface) to permit simple review of both the value determined via OCR processing and the actual value of the payment coupon. In one embodiment, all field values are presented to the payer 110 at once. The payer 110 may then review all fields at the same time and alter, if necessary, any fields that are to be altered. However, in another embodiment, the payment service provider system 105 may present each field value to the payer 110 individually, allowing the payer 110 to individually review and either confirm or alter each field. In this embodiment, processing would repeat until all fields have been presented to the payer 110, and the values are confirmed and/or modified.

FIG. 6C illustrates an example user interface 615 in which all of the field values are presented to the payer 110 for review and confirmation and/or modification. As mentioned, in one embodiment, a similar user interface may be generated that also includes a presentation of the scanned payment coupon image.

In another embodiment, the payment coupon image may be displayed to the payer 110 which includes the approximate location of each field based on the field indicators provided by the payer 110. For example, the image could include a box or other shape (e.g., a border, etc.) represented on the payment coupon image. If the location, shape, and/or dimensions of one or more of the field locations presented to the payer 110 are not accurately positioned, the payer 110 may re-position or otherwise alter the field indicator to provide a more accurate indication of the approximate location field within the payment coupon image.

It is appreciated that, while OCR processing is generally described as being performed by the payment service provider system 105, in other embodiments, a fat client payment coupon imaging application may be configured to perform some or all payment coupon OCR scanning locally by the payer's computer 115, instead of, or in addition to, being processed by the payment service provider system 105. For example, a payment coupon imaging application may include an OCR module operable to process a locally stored payment coupon image. In this embodiment, the payment coupon image may be stored locally for OCR processing, and the payment coupon field values extracted therefrom may be presented to the payer 110 for review and confirmation and/or modification.

After display of one or more of the field values to the payer 110, decision block 540 follows. At decision block 540 it may be determined whether modifications are to be made to the payment coupon field values and/or payment coupon metadata (e.g., data represented by the field indicators) based on the payer's 110 response(s). If so, operations continue at block 545 in which the field values and/or payment coupon metadata may be updated or otherwise modified. After modification, or if no modifications are to be performed at block 540, operations continue at block 550. At block 550, the payment service provider system 105 may store or update payment coupon metadata and/or other payment coupon information, such as may be stored in the payment coupon database 170. For example, the payment coupon layout information captured by the field indicators may be stored in the payment coupon database 170 and associated with the biller identified for the payment coupon, allowing indexing and look-up by the biller. New or updated biller information, such as biller name (or other identifier), address, and/or biller phone number, may also be stored in the payment coupon database 170.

It is appreciated that, in some embodiments, payment coupon metadata may instead, or additionally, be associated with a payment coupon type, which may be specific to a single biller or may be a payment coupon type utilized by multiple billers. Thus, in example embodiments, payment coupon metadata can be looked up by payment coupon type instead of, or in addition to, being looked up by biller name. In addition to payment coupon layout information, the payment service provider system 105 may separately store or otherwise maintain the field values associated with the instant payment coupon, such as in temporary storage, a payments or transactions database, and/or a biller database, to permit subsequent processing of the payment coupon. Subsequent transaction processing, such as, but not limited to, processing a payment request on behalf of the payer 110, adding a biller to the payer's 110 biller list, and/or activating the biller as an electronic biller for the payer 110, is described in more detail with reference to FIGS. 4A-4B.

The method 500 may end after block 550, having captured payment coupon layout information from the payer 110, which will permit processing the instant and subsequent payment coupon images from the same biller (and/or of the same payment coupon type).

FIGS. 7A-7B represent a flow diagram of an example method 700 for capturing a payment coupon image by a payer and transmitting the payment coupon image to a payment service provider for processing, according to one embodiment. However, in this embodiment, instead of utilizing a computer 115 and a scanner device 120, the payer 110 uses a mobile device having a camera, such as a mobile device 125 described with reference to FIG. 1. The camera of the mobile device 125 can be used to take a digital photograph of a payment coupon. The mobile device 125 has a display and interface that will allow presenting, identifying, and/or modifying payment coupon layout and/or field values, if necessary. Accordingly, in example embodiments, certain operations of the method 700 may be performed by one or more payment service provider computers associated with a payment service provider system (e.g., those operations on the left side of FIGS. 7A-7B), such as the payment service provider computers 160 associated with the payment service provider system 105 described with reference to FIG. 1, while other operations may be performed by a payer's mobile device 125 (e.g., those on the right side of FIGS. 7A-7B). It is appreciated, however, that in some embodiments, such as in embodiments utilizing a fat client application executed locally on a payer's mobile device 125, some or all of the operations illustrated as being performed by the payment service provider system 105 in FIGS. 7A-7B may be performed on the mobile device with the fat client application being executed locally. However, in other embodiments, certain operations of the method 700 may be performed by one or more other components, such as by one or more suitable financial institution systems instead of, or in addition to, the operations performed by the payment service provider system.

According to one example embodiment, a payer's mobile device 125 is operable for wireless transmissions directly with the payment service provider system 105, such as over a wireless network 150 utilizing SMS and/or MMS messaging capabilities and a local or fat client mobile payment coupon photo application installed and executed locally on the mobile device 125. In another embodiment, the payer's mobile device 125 is configured for Internet communications, and operable for accessing a thin client mobile payment coupon photo application using a browser application over a network 145, such as the Internet, via a wireless network 150 adapted for Internet access. In yet another embodiment, the payer's mobile device 125 may have a local or fat client mobile payment coupon photo application installed thereon, which provides for communications with the payment service provider system 105 over a network 145, such as the Internet, via a wireless network 150 adapted for Internet access. Accordingly, a fat client mobile payment coupon photo application may be downloaded over the network 145 from the payment service provider system 105 (or other system) or installed from local media (e.g., removable disc, removable storage drive, etc.). In yet other embodiments, the mobile payment coupon photo application may be provided as a combination of thin and fat client applications, primarily accessed over the network 145 and the wireless network 150 and executed utilizing a web browser, but having some functionality provided by locally executed applications, such as web applets operable for controlling or otherwise interacting with the mobile device's camera. Aside from the means by which the payment coupon image is captured (e.g., capturing a digital photograph) and possible means by which a payment coupon image may be transmitted to the payment service provider (e.g., as a MMS message in one embodiment), the method 700 is performed in a similar manner as the methods 300, 400 described with reference to FIGS. 3-4B. Accordingly, when describing the method 700 below, details will be provided for the operations that differ from the methods 300, 400.

The method 700 may begin at block 705. At block 705, the payer 110 may activate a mobile payment coupon photo application on the mobile device 125. If the application is a thin client application, the one or more webpages may be transmitted over the network 145 (e.g., the Internet) via a wireless network 150 for display on the mobile device 125. If the application is a local fat client application, then the payer 110 may initiate the application on the mobile device 125. In one embodiment, the payer 110 may first download (or otherwise install) a local instance of the application on the mobile device 125, such as if one has not yet been installed or if a new update is available after verifying the current version with the payment service provider system 105.

Following block 705 is block 710 or, alternatively, block 712, in which instructions may be presented to the payer 110 to take a photograph of the payment coupon. If the mobile payment coupon photo application is a thin client application, instructions may be transmitted from the payment service provider system 105 at block 710. However, if the application is a fat client application, or at least certain portions are executed locally, then the instructions may be provided in response to local execution on the mobile device 125 at block 712.

Figure 8A:
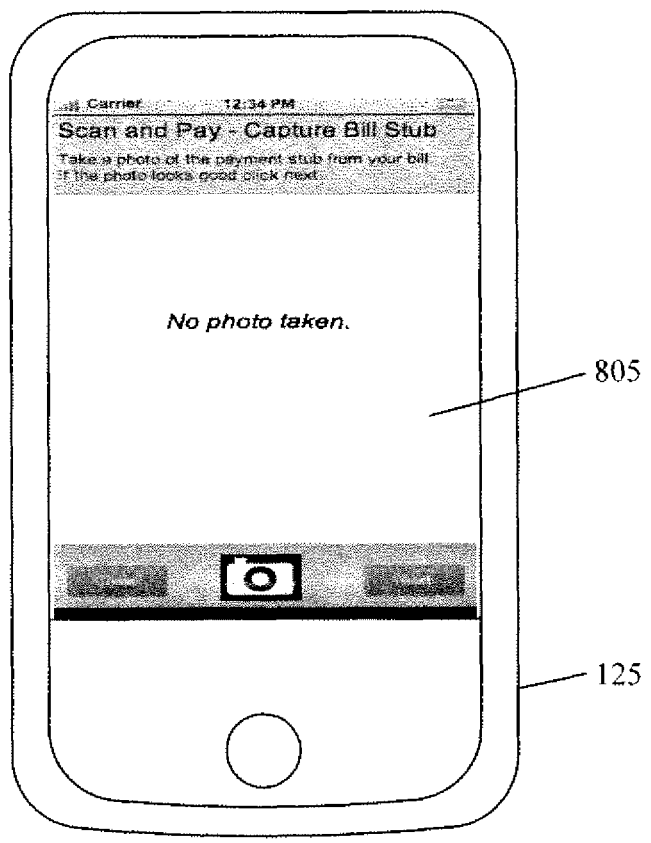
FIGS. 8A-8D illustrate example user interfaces, according to example embodiments of the invention.

Instructions presented to the payer 110 may generally include instructions such as, but not limited to, directing proper orientation of the payment coupon, selecting image resolution, and the like. FIG. 8A illustrates an example user interface 805 of a mobile payment coupon photo application after instantiation and presenting instructions to take a photograph of a payment coupon using the mobile device 125. In the embodiment shown by the user interface 805, the mobile payment coupon photo application may integrate with, or otherwise issue a command to, the camera of the mobile device 125. Accordingly, an input option (e.g., picture button, etc.) may be displayed that allows the payer 110 to take a photograph within the application without requiring the payer 110 to access the camera separately apart from the application. It is appreciated, however, that any number of user interface options for a mobile payment coupon photo application may be provided, and that the aforementioned examples and illustrations are provided for illustrative purposes and are not intended to be limiting.

Figure 8B:
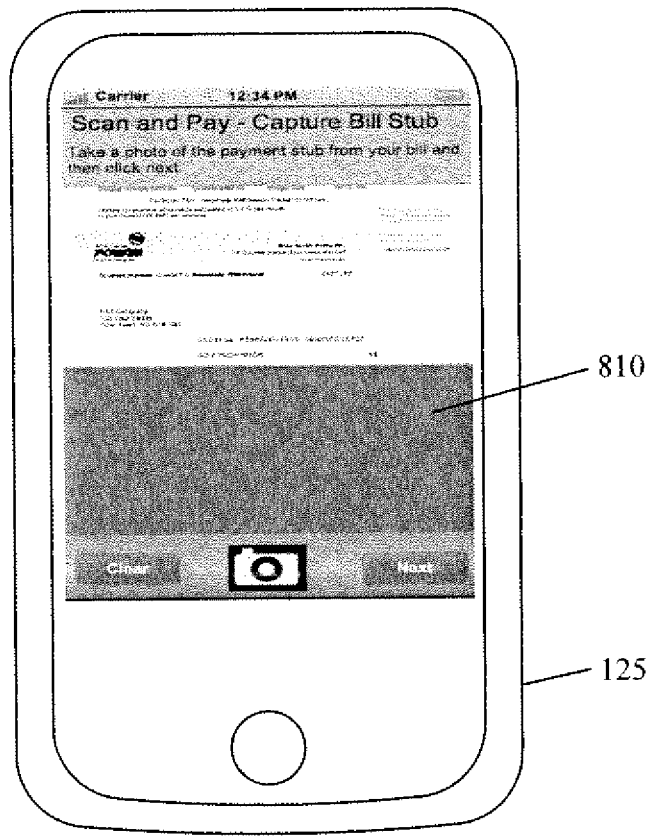

At block 715, the payer 110 uses the mobile device 125 to take a photograph of the payment coupon as instructed. FIG. 8B illustrates an example user interface 810 displaying a photograph of a payment coupon using the mobile device 125. After taking the photograph, the digital image of the payment coupon is transmitted to, and received by, the payment service provider system 105 at blocks 720-725. According to one embodiment, the payment coupon photograph may be transmitted to the payment service provider system 105 over a network 145, such as the Internet, via a wireless network 150, such as if the mobile device 105 is web-enabled. According to another embodiment, the payment coupon photograph may be transmitted to the payment service provider system 105 as a message, such as a MMS message or any other suitable messaging protocol, over the wireless network 150. In yet another embodiment, the payment coupon photograph may be attached to an email to the payment service provider system 105, which may be generated from a template provided by the mobile payment coupon photo application.

At block 725, the payment service provider system 105 receives the payment coupon photograph. Upon receipt, the payment service provider system 105 may then attempt to identify the biller from the payment coupon photograph, in the same or similar manner as is described with reference to block 410 of FIG. 4A. If the biller name (or other identifier) is identified, it is determined whether payment coupon metadata exists for the biller at decision block 730, in the same or similar manner as is described with reference to block 415 of FIG. 4A. If the payment coupon metadata does exist for the biller and/or type of payment coupon, then operations continue to block 755 to determine field values for the payment coupon.

However, if it is determined at decision block 730 that payment coupon metadata has not already been captured for the biller and/or payment coupon type, then operations proceed to blocks 735-750 to capture from the payer 110 the layout of the payment coupon. At block 735, the payment service provider system 105 may transmit a request and instructions to the payer 110 to provide one or more field indicators in a manner similar to that described with reference to FIG. 5. The request and instructions may be delivered as a new webpage, or may be transmitted as one or more commands to a local application to cause the local application to present the instructions and interface for capturing the one or more field indicators. According to one embodiment, the payment coupon photograph, or a portion thereof, is also transmitted for display to the payer 110, for use when providing the field indicators. In another embodiment, the application may recall a locally stored photograph instead of requiring a photograph be re-transmitted.

Thus, at block 740, the payer 110 may provide input to the mobile device to identify one or more field indicators, in a similar manner as is described with reference to FIG. 5. Because the screen size of many mobile devices 125 may be limited, in one embodiment, only a portion of the payment coupon photograph is displayed at a time. The mobile device 125 may enable the payer 110 to move the portion of the payment coupon photograph displayed (e.g., by touch screen, scroll wheel, pointer, or other input device). For example, the payment coupon photograph may be sized such that a single field can be displayed at a time for entry of one or more field indicators associated therewith.

A number of interface controls can be provided by the mobile payment coupon photo application, which may be similar to those described with reference to FIG. 5, for instance. In one example, the payer 110 may use a mobile device 125 input function (e.g., touch screen, scroll wheel, pointer, etc.) to identify the center of a field, one or more edges of a field (e.g., left, right, top, and/or bottom), or one or more corners (e.g., to indicate a diagonal across the field). Similarly, the payer 110 may draw or otherwise position a rectangle or other shape outlining a field, and optionally re-size a drawn shape if desired. Drawing or positioning a shape to outline a field may be better suited for a mobile device 125 having a touch screen interface; however, other input devices may be utilized in a similar manner as desired.

In one embodiment, one or more text entry fields may also be displayed to allow the payer 110 to enter alphanumeric field indicator information. For example, a field type or a field value may be entered with the mobile device 125, as shown in blocks 740 and 745.

After providing one or more field indicators, and any additional associated payment coupon information, block 750 follows, in which the field indicator or indicators may be transmitted to the payment service provider system 105 for additional processing. In one embodiment, all field indicators may be entered by the payer 110 all at once prior to transmitting to the payment service provider system 105. For example, the mobile payment coupon photo application may present a user interface that permits entry of more than one field indicator and requests submission and transmission when complete. In another embodiment, however, each field indicator may be transmitted to the payment service provider system 105 separately. For example, a user interface may instruct the payer 110 to enter one field indicator at a time, and proceed in stepwise fashion to transmit the field indicator data to the payment service provider system 105 after each entry.

Upon receiving field indicator data for one or more fields of the payment coupon, the payment service provider system 105 may continue to process the payment coupon photograph at block 755 of FIG. 7B. For example, as described with reference to block 530 of FIG. 5, the payment service provider system 105 then performs OCR processing to determine field values for one or more fields of the payment coupon based at least in part on the field indicator data provided by the payer 110. It is appreciated that, according to one embodiment, one or more additional presentations may optionally be generated and transmitted to the payer's mobile device 125 that include information representing the field indicators and/or the payment coupon metadata, allowing the payer 110 to review and confirm or modify the payment coupon metadata prior to performing OCR processing to determine payment coupon field values. This additional processing may be formed in the same or similar manner as is described with reference to FIG. 5, such as at blocks 535-545, for example.

Figure 8C:
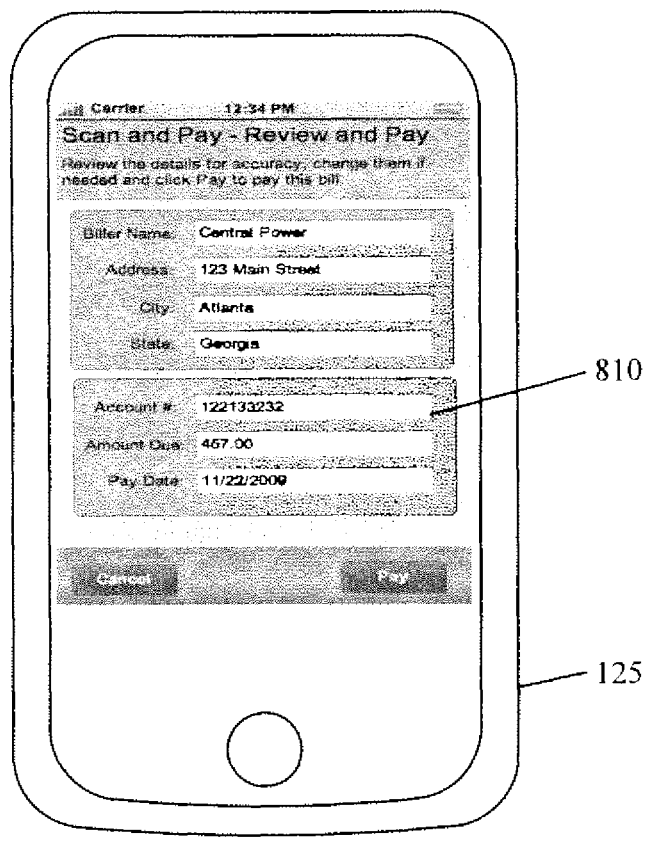

After determining the field values, the payment service provider system 105 may then transmit field values for the payment coupon to the payer's mobile device 125, over the Internet as a webpage or using messaging (e.g., SMS messaging, MMS messaging, etc.), at block 760. In one embodiment, one or more of the field values are displayed in a modifiable user interface (e.g., text entry fields, etc.) to permit modification by the payer 110 upon review if desired. In response, the payer 110 may review, confirm, and/or modify one or more of the field values presented at block 765 and transmit the confirmation and/or modification response back to the payment service provider system 105. FIG. 8C illustrates an example user interface 815 displaying each of the field values in text entry fields on the mobile device 125. The user interface 815 of this embodiment, therefore, allows the payer 110 to modify one or more of the field values and/or request the payment be processed using the "pay" input option. It is appreciated, however, that any number of user interface options for a mobile payment coupon photo application may be provided, and that the aforementioned examples and illustrations are provided for illustrative purposes and are not intended to be limiting.

It is appreciated that, while OCR processing is generally described as being performed by the payment service provider system 105, in other embodiments, a fat client mobile payment coupon photo application may be configured to perform some or all payment coupon OCR scanning locally by the mobile device 125, instead of, or in addition to, being processed by the payment service provider system 105. For example, a mobile payment coupon photo application may include an OCR module operable to process a locally stored payment coupon photo. In this embodiment, the payment coupon photo may be stored locally for OCR processing, and the payment coupon field values extracted therefrom may be presented to the payer 110 for review and confirmation and/or modification.

Figure 8D:
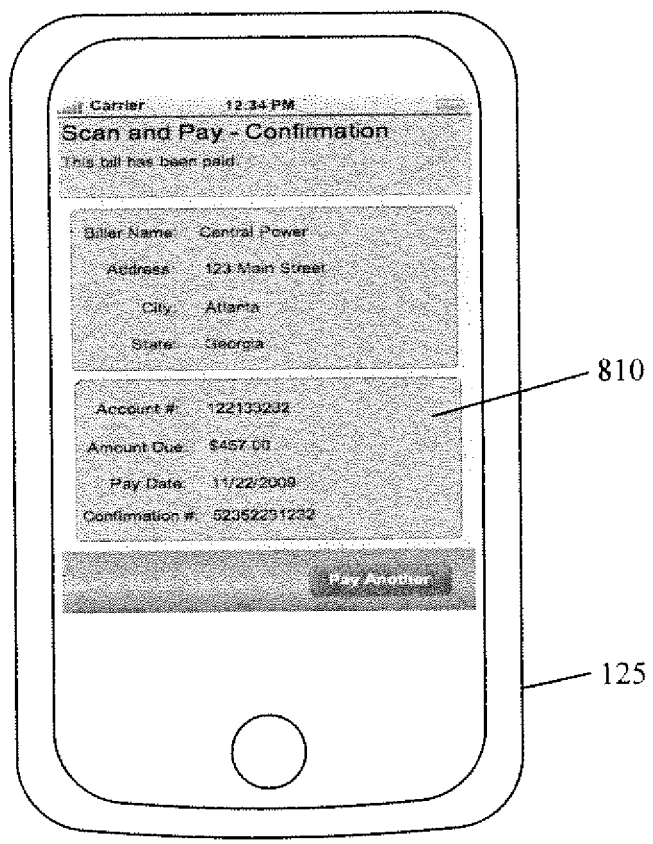

Upon receipt of the confirmation and/or modification response, the payment service provider system 105 may continue processing the payment coupon photograph at block 770. For example, the payment service provider system 105 may store and/or update payment coupon metadata or other information maintained in the payment coupon database 170 with field indicator data and/or field value information received to facilitate further processing of the instant payment coupon photograph as well as any subsequent payment coupon photographs or images from the same biller and/or of the same type, such as is described with reference to block 550 of FIG. 5. In addition, the payment service provider system 105 may also continue processing the payment coupon, such as, but not limited to, processing a payment request on behalf of the payer 110, adding a biller to the payer's 110 biller list, and/or activating the biller as an electronic biller for the payer 110. Subsequent transaction processing is described in more detail with reference to FIGS. 4A-4B. FIG. 8D, for example, illustrates an example user interface 820 displaying a confirmation of a processed payment with an option for the payer 110 to repeat the method 700 to capture another payment coupon.

The method 700 may end after block 770, having received a payment coupon photograph from a payer 110 utilizing a mobile device 125. In addition, in some instances of performing the method 700, payment coupon layout is determined, which will facilitate processing the payment coupon photographs and images from the biller and/or of the same type.

FIG. 9 represents a flow diagram of an example method 900 for capturing multiple payment coupon images by a payer all at once and collectively transmitting all of the payment coupon images in a batch to a payment service provider for processing, according to one embodiment. This method 900 is similar to the method 300 described with reference to FIG. 3, although the payment coupon imaging application is configured to allow the payer to scan multiple payment coupons all at once, which may be useful to efficiently add multiple billers to a payer's biller list or to efficiently process multiple payment requests. In example embodiments, certain operations of the method 900 may be performed by one or more payment service provider computers associated with a payment service provider system, such as the payment service provider computers 160 associated with the payment service provider system 105 described with reference to FIG. 1, while other operations may be performed by a payer's computer and scanner device in communication therewith, such as a computer 115 and a scanner device 120 described with reference to FIG. 1. However, in other embodiments, certain operations of the method 900 may be performed by one or more other components, such as by one or more suitable financial institution systems instead of, or in addition to, the operations performed by the payment service provider system. Aside from the ability to scan and transmit multiple payment coupons all at once, the method 900 is performed in a similar manner as the method 300 described with reference to FIG. 3. Accordingly, when describing the method 900 below, details will be provided for the operations that differ from the method 300.

The method 900 may begin at block 905. At block 905, an option to scan multiple payment coupons may be presented to the payer 110 in the same or similar manner as described with reference to block 305 of FIG. 3. Blocks 910-925 are performed in the same or similar manner as blocks 310-325 of FIG. 3, receiving a payer's selection to provide multiple payment coupon images, activating control (or otherwise interfacing with) a scanner device 120, and presenting scanning instructions to the payer 110, respectively. The instructions presented to the payer 110 at block 925 may, in some instances, differ, including instructions for scanning multiple payment coupons all at once. For example, according to one embodiment, the payment coupon scanning instructions may request that the payer 110 scan the entire page on which each payment coupon is displayed. Because it is possible that different payment coupons could have different dimensions and occupy different real estate of the respective pages on which they are displayed, scanning multiple coupons may be simplified by scanning entire pages. It is appreciated, however, that the payment coupon imaging application may be configured to allow separating each payment coupon from the page on which it displayed and to instruct the payer 110 accordingly. Moreover, in various embodiments, instructions are presented as to how to feed or otherwise orient each payment coupon with the scanner device 120. For example, scanning multiple payment coupons may be simplified even more for the payer 110 if the scanner device 120 includes an automatic feed capability. However, depending upon the scanner device 120, the payment coupon imaging application may allow for, and the instructions presented may instruct, manual feeding of each respective payment coupon, even for transmissions including a batch of payment coupon images.

Following block 925 are blocks 930-940, in which the payer 110 may activate the scanner device 120 at block 930, and scan multiple payment coupons at block 935, repeating blocks 935-940 for each payment coupon scanned. For example, a first payment coupon may be scanned at block 935 and stored, at least temporarily, in the local memory of the computer 115. After block 935, decision block 940 determines whether additional payment coupons are to be scanned. This determination may be made in a number of ways. For example, in an embodiment in which the payment coupons are being automatically fed into the scanner device 120, the scanner device 120 will continue to scan until there are no additional pages to scan, as is done with conventional multiple page scans. In one embodiment, scanning each payment coupon is coordinated, or otherwise facilitated, at least in part by the payment coupon imaging application, such as with an applet or other integration means between the application and the scanner device 120, as described with reference to FIG. 3. In an embodiment in which the payment coupons are being manually fed or otherwise placed with the scanner device 120, then the payment coupon imaging application may present instructions and coordinate scanning for each individual payment coupon. For example, after a first scan is performed, the payment coupon imaging application may solicit the payer's 110 input as to whether additional payment coupons are to be scanned and/or input or when to perform scanning on the next payment coupon after it is positioned with the scanner device 120. In either embodiment, automatic or manual feeding, the payment coupon imaging application may include an input option which the payer 110 selects when all payment coupons have been scanned and scanning is completed (e.g., "finished," "complete," "done," etc.). Accordingly, blocks 935 and 940 are repeated until there are no more payment coupons to be scanned and/or until the payer 110 indicates that scanning is completed.

After all payment coupons are scanned at the payer's computer 115, operations continue to block 945. At block 945, the payer 110 may then instruct transmission of the batch of scanned payment coupon images to the payment service provider system 105. Each payment coupon image may be retrieved from a local memory of the payer's computer 115 prior to transmission. In one embodiment, similar to that described with reference to block 340 of FIG. 3 and the user interface 610 of FIG. 6B, the scanned payment coupon images may be displayed to the payer 110 prior to transmission to the payment service provider system 105. Upon receiving the batch of scanned payment coupon images at block 950, the payment service provider system 105 may then proceed to process the batch of payment coupon images, such as is described in more detail with reference to FIGS. 10A-10B.

After receiving the batch of payment coupon images, the method 900 may end, having enabled a payer 110 to utilize a computer 115 and a scanner device 120 to capture payment coupon information from multiple bills and transmit the batch of payment coupon images to a payment service provider system 105.

Figure 10A:
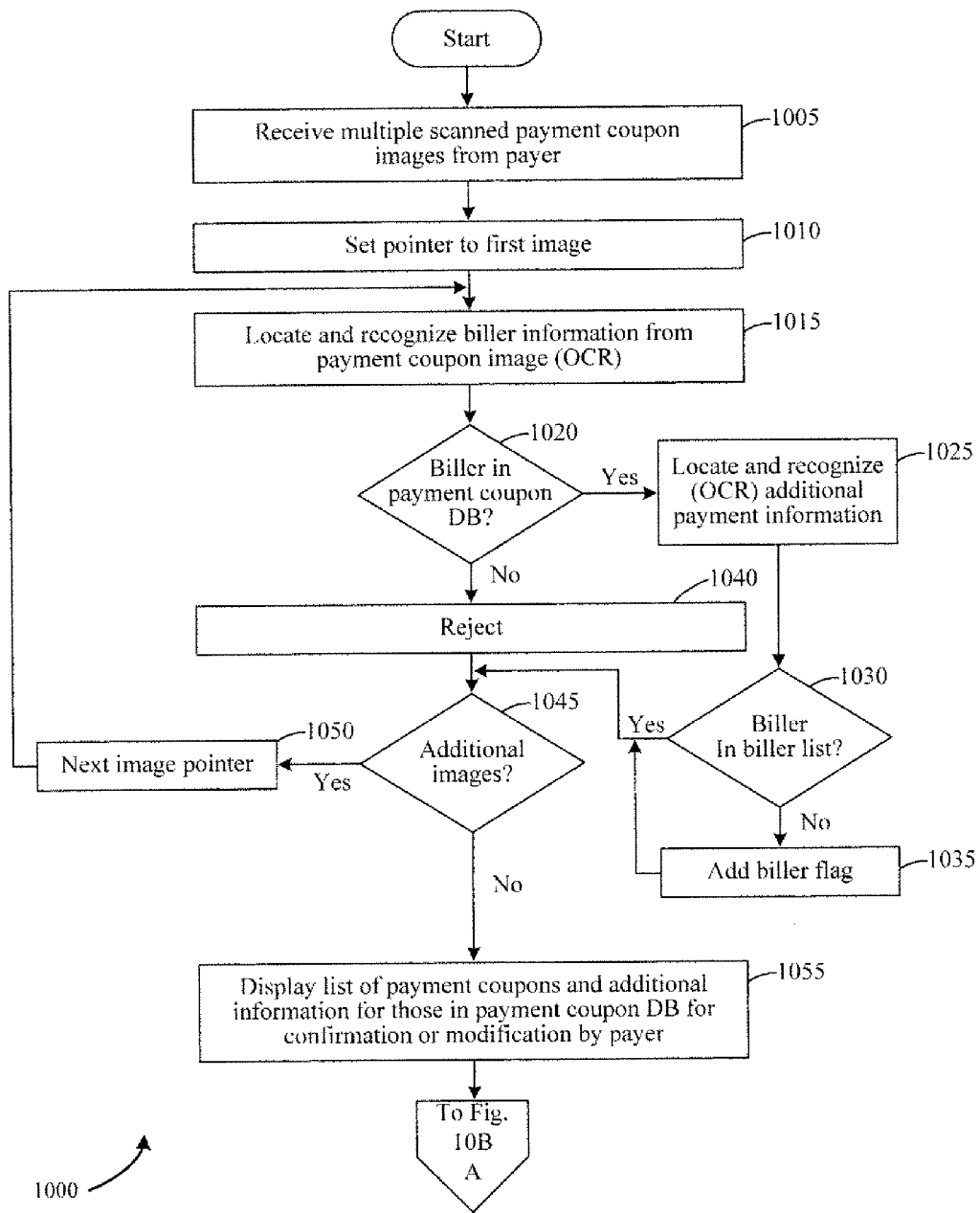
FIGS. 10A-10B illustrate a flow diagram of an example method for processing multiple payment coupons, according to an example embodiment of the invention.
Figure 10B:
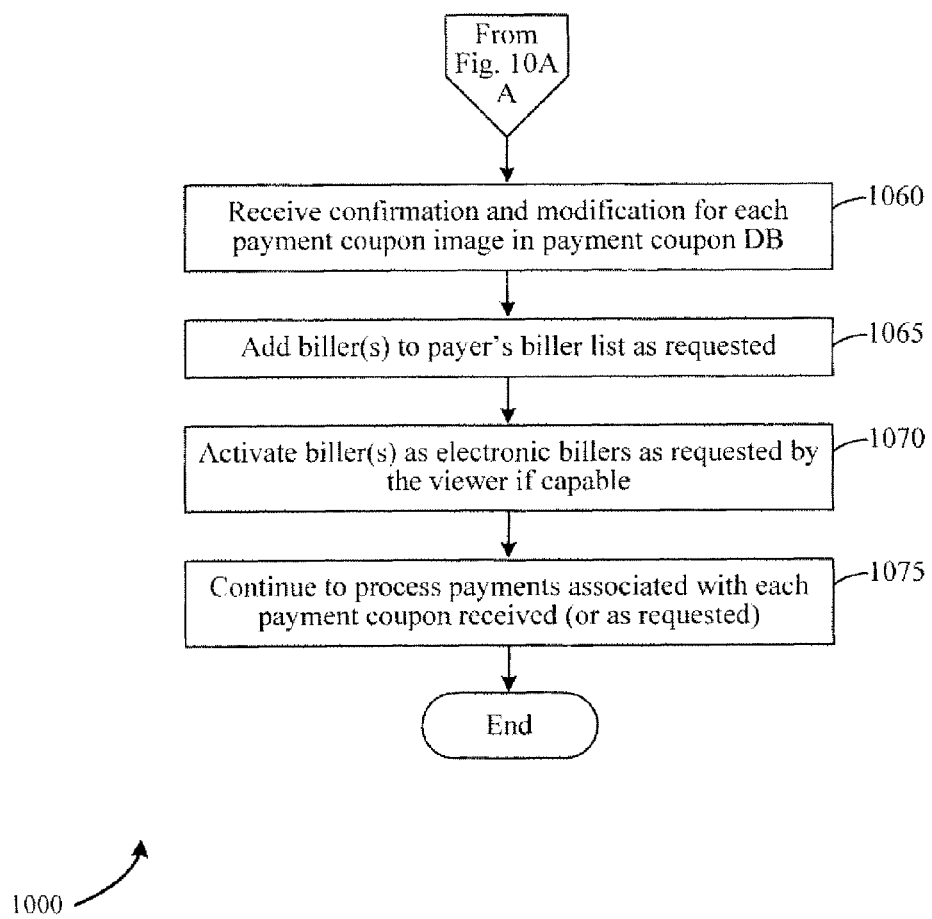

FIGS. 10A-10B represent a flow diagram of an example method 1000 for processing a batch of payment coupon images transmitted by a payer, according to one embodiment. This method 1000 is similar to the method 400 described with reference to FIGS. 4A-4B, with the exception that the payment service provider system 105 is configured to process multiple coupon images all at once, simplifying payer transactions containing a request for processing of multiple items. Example processing may be performed by one or more software application modules of the payment service provider system, such as the coupon image module 180 described with reference to FIG. 1. Example operations include, but are not limited to, capturing payment coupon metadata or other information, adding one or more billers to a payer's biller list, activating one or more billers as electronic billers, and/or processing one or more payment requests corresponding to payment coupons received in the batch of payment coupon images. In example embodiments, certain operations of the method 1000 may be performed by one or more payment service provider computers associated with a payment service provider system, such as the payment service provider computers 160 associated with the payment service provider system 105 described with reference to FIG. 1. However, in other embodiments, certain operations of the method 1000 may be performed by one or more other components, such as by one or more suitable financial institution systems and/or by a payer's device, such as by a mobile device 125 performing local processing, instead of, or in addition to, the operations performed by the payment service provider system.

The method 1000 may begin at block 1005. At block 1005, the payment service provider system 105 receives a batch of multiple scanned payment coupon images from a payer's computer 115, as described with reference to FIG. 9. Each payment coupon image may represent only the respective payment coupon, such as if the payer 110 separated the payment coupon from the page on which it is displayed, or each may represent an entire scanned bill page containing a respective payment coupon and other immaterial information. Additional processing may optionally be performed to first identify and isolate each payment coupon from the immaterial portion of the respective image if it is determined that the images received at block 1005 represent more than the payment coupon (e.g., if the payment coupon was not separated from the rest of the page). Details of example operations to identify and isolate the payment coupon area from an entire image are described in more detail with reference to blocks 330-340 of FIG. 3.

Following block 1005 is block 1010, in which a pointer, counter, or other means to designate which of the multiple payment coupon images is being processed, may be set to the first payment coupon image. A pointer or other similar means facilitates looping through the processing in blocks 1015-1050 for each payment coupon image in the batch. Next, at block 1015, the payment service provider system 105 may locate a biller name or other biller identifier from the first payment coupon image of the batch (or subsequent image being processed), such as via OCR processing, in the same or similar manner as described with reference to block 410 of FIG. 4A.

In one embodiment, if no biller information is discernable from the payment coupon image at block 1015, the payment service provider system 105 may initially reject the payment coupon image, requiring the payer 110 to process the corresponding payment coupon via other techniques. The payment service provider system 105 may store a rejection indicator to permit indicating rejected payment coupon images all at once after processing all payment coupon images in the batch to avoid disrupting the processing flow of the multiple coupon image processing. Though, in other embodiments, the payer 110 may be notified for each rejected payment coupon image as it is being processed.

Following block 1015 is decision block 1020, in which the payment service provider system 105 may compare the biller information obtained from the payment coupon image at block 1015 to stored payment coupon metadata, such as may be stored in the payment coupon database 170 described with reference to FIG. 1. Payment coupon metadata associated with the biller indicates whether the layout of the payment coupon received from the biller is known. The operations of block 1020 can be performed in the same or similar manner as is described with reference to block 415 of FIG. 4A.

If it is determined at decision block 1020 that payment coupon metadata does exist for the biller identified, then operations continue to block 1025 to determine payment coupon information from the payment coupon image being processed utilizing OCR processing and the known payment coupon layout provided by the payment coupon metadata for payment coupons from this biller. Payment coupon information may be determined in the same or similar manner as is described with reference to block 425 of FIG. 4A, such as to locate one or more payment coupon fields and determine the field values for the respective fields.

At decision block 1030, the payment service provider system 105 may determine whether the biller associated with the payment coupon is already associated with the payer 110 as an approved biller in the payer's biller list in the same or similar manner as is described with reference to block 430 of FIG. 4A. If the biller is not already associated with the payer's biller list, then, at block 1035, an "add biller flag" or other indicator may be set for the payment coupon image being processed to permit subsequent indication that the biller is not in the payer's biller list and/or to request adding the biller to the payer's biller list. It is appreciated that in other embodiments, instead of, or in addition to, setting a flag for subsequent action, the payment service provider system 105 may transmit a notification and request to the payer's computer 115 while processing the payment coupon image; although, this may slightly disrupt the more efficient batch processing at least from the payer's perspective.

However, if it is determined at decision block 1020 that payment coupon metadata does not exist for the biller identified, then operations continue to block 1040, in which a reject status or other indicator may be set for the payment coupon image being processed to indicate that the payment coupon layout is unknown. In one embodiment, rejected payment coupon images may simply be indicated as such to the payer 110, and require processing of the payment coupon by another technique. However, in other embodiments, one or more of the rejected payment coupon images may be presented to the payer 110 (e.g., re-transmitting the image to the payer's computer 115) for the payer 110 to indicate the payment coupon layout, such as by providing one or more field indicators and/or field values for each field of the payment coupon, in the same or similar manner as is described in more detail with reference to FIG. 5.

Following one of blocks 1030, 1035, or 1040 is decision block 1045. At decision block 1045, it may be determined whether there are any additional payment coupon images in the batch to be processed. If there are additional payment coupon images, then the pointer, counter, or other means to designate which of the multiple payment coupon images is being processed, is increased to indicate the next payment coupon image and operations of blocks 1015-1045 are repeated until all payment coupon images of the batch have been processed.

After all payment coupon images of the batch have been processed, operations continue to block 1055. According to one embodiment, at block 1055, a presentation of all payment coupons that were able to be processed (e.g., those not rejected above at block 1040) and corresponding payment coupon information determined at block 1025 may be presented to the payer 110. For example, in one embodiment, a user interface may display the scanned image for each payment coupon in addition to field values for each field of the respective payment coupon. The scanned image may be displayed in a large format occupying a significant portion of the display or may be displayed in a smaller format, such as a thumbnail or icon that can optionally be selected for expansion by the payer 110. One or more of the field values may be modifiable by the payer 110 (e.g., text entry field, etc.), allowing the payer 110 to correct or modify field values determined by the payment service provider system 105 via OCR processing. The payer 110 may then scroll or otherwise navigate the user interface to view each payment coupon processed. In another embodiment, the user interface may contain a simplified list view, listing field values and other pertinent information for each payment coupon processed. For example, a row for each payment coupon processed may be displayed with field values in columns, one or more of which may be modifiable.

Information to be presented at block 1055 may include, but is not limited to, biller name (or other identifier), biller address, account information, amount due, payment amount, date due, payment date, and the like. It is appreciated that, in some embodiments, fields that are not modifiable (e.g., biller address information for which there was a match in the payment coupon database 170, and thus presumed accurate) may not be presented to the payer at all to simplify the user interface and conserve display real estate. In addition, the payment coupon information presented may further include an indication as to whether the respective biller is already associated with the payer's biller list and/or whether the biller is already an electronic biller for the payer 110 if the biller supports electronic billing. It is appreciated that any number of user interfaces and means for displaying payment coupon information may be provided, and that the aforementioned examples are illustrative and not intended to be limiting.

Accordingly, upon presenting the payment coupon information to the payer 110, the payer 110 may review, confirm, and/or modify information presented for one or more of the payment coupons, in a similar manner as is described with reference to blocks 540-545 of FIG. 5. For example, the payer may confirm some information as provided and provide a modification of others by providing desired input into one or more associated text entry fields. In addition, in some embodiments, the payer 110 may indicate whether a biller not already added to the biller list is to be added and/or whether a capable biller not already designated as an electronic biller is to be activated as an electronic biller.

Therefore, following block 1055 is block 1060 of FIG. 10B, in which the payment service provider system 105 may receive confirmation or modification for each of the presented payment coupons. Upon receiving the confirmation and/or modifications, the payment service provider system 105 may then process each payment coupon to add the respective biller to the payer's biller list at block 1065 if requested, to activate the respective biller as an electronic biller at block 1070 if capable and if requested, and/or to process a payment corresponding to the respective payment coupon at block 1075 if requested.

Any or all of blocks 1065-1075 may be performed for each of the payment coupon images processed. For example, a payer 110 may not wish to add every biller identified to a biller list, or a payer 110 may not wish to receive electronic bills from every biller identified. Similarly, in some instances, a payment request may not be processed for every (or any) payment coupon images processed, such as if the payer 110 utilizes the batch payment coupon scanning operations for the purpose of adding billers but not to process payment requests. It is further appreciated that these subsequent processing operations may be performed in any order, for example, any payment requests may be processed prior to adding billers to a biller list or activating electronic billers.

Moreover, it is further appreciated that, according to some embodiments, separate requests to add billers to a biller list and/or to activate billers as electronic billers may be presented to the payer 110. For example, these requests can be performed after processing any payment requests to avoid disrupting more efficient batch payment request processing, saving any additional transaction processing with the payer 110 until payment request processing is complete. In one example embodiment, a user interface may contain a single display of all the billers, and optionally any corresponding biller information (e.g., address, etc.) and/or payer information (e.g., payer's account with the biller, etc.), from payment coupons that are capable of electronic billing but not yet activated for the user. A similar user interface can be presented for billers not yet associated with the payer's biller list. In response, the payer 110 can then provide any needed information and submit a request to activate the billers as electronic billers and/or to add the billers to the payer's biller list, as desired, in a single submission. In another embodiment, information for each biller for which there is an opportunity to add to a biller list or to activate as an electronic biller can be displayed individually, allowing the payer 110 to respond separately for each biller.

Although not illustrated, in some embodiments, additional operations may include obtaining from the payer 110 payment coupon layout information (e.g., field indicators identifying approximate field locations, sizes, dimensions, types, etc.) for those payment coupon images of the batch for which no payment coupon metadata existed in the payment coupon database 170, as determined at block 1020. The operations for obtaining payment coupon layout information may be performed in the same or similar manner as described with reference to FIG. 5. In one embodiment, payment coupon layout information may be gathered from the payer 110 after performing the above operations. In this manner, payment coupon layout information will be gathered after completing processing for the payment coupon images for which processing can be performed. The payer 110 may therefore elect to provide payment coupon layout information or may decline to do so without causing a significant interruption in the other transaction processing. However, in other embodiments, the payment coupon layout information may be gathered at various other stages of the method 1000, such as after block 1040 when it is initially determined that no payment coupon metadata exists, or at once immediately prior to, or after, displaying the payment coupon information for those capable of being processed at block 1055.

The method 1000 may end after block 1075, or after any additional processing as described above, having received a batch of scanned payment coupon images from a payer 110 and performed OCR processing on each image to identify the biller, and to perform subsequent processing requested therefor.

Accordingly, the systems and methods described herein provide a unique approach to processing payment and other related transactions utilizing paper bills exactly as delivered by billers. Payers' efforts may be simplified by only requiring that the payer scan the payment coupon as received utilizing a computer and scanner device, or take a digital photograph of the coupon utilizing a mobile device camera, and transmit the scanned image to a payment service provider system for processing. If payment coupon metadata exists for the payment coupon biller and/or type sent, then the payment service provider can process the payment coupon without requiring an overabundance of input from the payer. If the payment coupon metadata does not exist for the biller or type, then the payment service provider can shift the responsibility and effort to identify the payment coupon layout to the payers, significantly reducing the generation and maintenance of payment coupon metadata. For some, processing payment requests by scanning or taking a digital photograph may be the normal mode for payers, instead of the conventional manual text-based techniques. For others, scanning or taking digital photographs of payment coupons may be used to facilitate the initial set-up for a first-time biller or to activate the biller as an electronic biller, while relying on more conventional techniques for repeated payment requests.

Accordingly, the example systems and methods described herein provide the ability for a payer who initially receives a paper bill to transform the paper bill into an electronic version for enabling the payment service provider systems to perform new or additional processing associated with information extracted from the electronic version. A payment coupon is transformed to an electronic version at least partially by scanning or photographing a paper payment coupon to generate a digital image representing the payment coupon. In addition, the payment service provider system further transforms the payment coupon digital image by performing OCR processing to identify and extract biller and/or payment coupon information from the digital image. The additional uses provided for by this transformation of a payment coupon into a digital image and the subsequent extraction of field values include adding the biller associated with the underlying paper payment coupon to a payer's biller list, activating the biller as an electronic biller for the payer, and/or processing a payment request with the biller on behalf of the payer based at least in part on data extracted from the payment coupon digital image. Moreover, additional uses provided for by the transformation of the paper payment coupon to a digital image include the generation of payment coupon metadata for billers and/or payment coupon types that are unknown to the payment service provider system, enabling subsequent processing of the instant and later received digital images. Therefore, by undergoing a transformation from a paper payment coupon to a digital image and/or data extracted therefrom, different functions and different uses by a payment service provider system are provided.

The operations described and shown with reference to the above methods 300, 400, 500, 700, 900, and 1000 may be carried out or performed in any suitable order as desired in various embodiments of the invention. Additionally, in certain embodiments, at least a portion of the operations may be carried out in parallel. Furthermore, in certain embodiments, less than or more than the operations described herein may be performed. Additionally, although the methods 300, 400, 500, 700, 900, and 1000 describe operations by which payment coupon image information is received from a payer, similar operations may be utilized to process the receipt of similar coupon information from any other entity.

The invention is described above with reference to block and flow diagrams of systems, methods, apparatus, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other embodiments of the invention will come to mind to one skilled in the art to which this invention pertains and having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method, comprising:
receiving, by a payment service provider system comprising one or more computers, an image representing a payment coupon;
determining, by the payment service provider system, an identity of a biller associated with the payment coupon from the image;
determining, by the payment service provider system based on the identity of the biller, that no payment coupon metadata for obtaining one or more fields from the payment coupon is stored in association with the biller;
requesting, by the payment service provider system responsive to determining that no payment coupon metadata is stored for the biller, a respective set of one or more field indicators representing at least an approximate size or an approximate location for each of the one or more fields within the image, wherein requesting the respective set of one or more field indicators for the one or more fields within the image further includes,
presenting the image to a user, and
instructing the user to graphically indicate on the image at least the approximate size or the approximate location for each of the one or more fields;
receiving, by the payment service provider system, the respective set of one or more field indicators for each of the one or more fields within the image; and
storing, by the payment service provider system, the respective set of one or more field indicators for the one or more fields within the image as at least a portion of the payment coupon metadata, wherein the payment coupon metadata is stored in association with the biller.

2. The method of claim 1, wherein the image comprises one of: (a) a scanned image of the payment coupon; or (b) a photograph of the payment coupon.

3. The method of claim 1, wherein determining the identity of the biller from the image comprises one of: (a) utilizing optical character recognition processing at a predetermined location on the image; or (b) receiving the identity of the biller from the user.

4. The method of claim 1, wherein the respective set of one or more field indicators for the one or more fields within the image comprises at least one of: (a) an x and y coordinate pair indicating the approximate location of the respective field; (b) an x and y coordinate pair indicating the approximate center of the respective field; (c) an x and y coordinate pair indicating a starting point for the respective field; (d) an x and y coordinate pair indicating an ending point for the respective field; (e) an indication of a location of one or more corners of the respective field; (f) a horizontal dimension; (g) a vertical dimension; (h) dimensions of a rectangle; or (i) a distance from a predetermined location within the image.

5. The method of claim 1, wherein receiving the respective set of one or more field indicators for the one or more fields within the image further comprises receiving an association of a field type for the one or more fields.

6. The method of claim 1, further comprising extracting data from the image based at least in part on the respective set of one or more field indicators for the one or more fields within the image.

7. The method of claim 6, further comprising presenting the extracted data to a user for confirmation or modification.

8. The method of claim 7, wherein the confirmation is presented with the image.

9. The method of claim 7, further comprising receiving modified data from the user responsive to presenting the extracted data to the user.

10. The method of claim 6, further comprising storing at least part of the extracted data in association with at least one of: (a) the biller; or (b) the user associated with the payment coupon.

11. The method of claim 6, further comprising processing a payment associated with the payment coupon based at least in part on the extracted data.

12. The method of claim 1, further comprising presenting the image to the user with a graphical indication of the location of the one or more fields within the image based at least in part on the one or more field indicators received.

13. The method of claim 12, further comprising receiving from the user one or more modifications to the respective set of one or more field indicators for the one or more fields within the image responsive to presenting the image with the graphical indication of the location of the one or more fields within the image to the user.

14. The method of claim 1, wherein the image is a first image representing a first payment coupon, and further comprising:
receiving a second image representing a second payment coupon subsequent to storing the respective set of one or more field indicators for the one or more fields within the image as the payment coupon metadata associated with the biller;
determining the identity of the biller based at least in part on information associated with the second image, wherein the identity of the biller is the same for the first image and the second image;
extracting data from the second image based on the payment coupon metadata associated with the biller; and
performing at least one of: (a) processing a payment associated with the second payment coupon based at least in part on the extracted data from the second image; (b) adding the biller to a list of billers for the user associated with the second payment coupon; or (c) activating the biller as an electronic biller for the payer associated with the second payment coupon.

15. The method of claim 1, wherein the image is received over a network via a web-based application.

16. The method of claim 1, wherein the image is received from a mobile device.

17. The method of claim 1, further comprising performing at least one of: (a) processing a payment associated with the payment coupon based at least in part on the extracted data from the image; (b) adding the biller to a list of billers for a payer the user associated with the payment coupon; or (c) activating the biller as an electronic biller for the payer associated with the payment coupon.

18. The method of claim 1, wherein the image and the one or more field indicators are transmitted by one of: (a) the user associated with the payment coupon; (b) the biller; or (c) a service provider performing payment processing on behalf of one of the biller or the payer.

19. A computer program product, comprising one or more non-transitory computer-readable media having instructions stored thereon for execution by one or more processors to perform the operations of:
receiving an image representing a first instance of a payment coupon of a biller;
requesting a respective set of one or more field indicators for each of one or more fields within the image, wherein requesting the respective set of one or more field indicators for each of one or more fields within the image further includes,
displaying the image via a user interface, and
enabling the user to indicate the respective set of one or more field indicators for the one or more fields within the image; and
receiving the respective set of one or more field indicators for the one or more fields within the image for subsequent processing, wherein the one or more sets of the one or more field indicators comprise payment coupon metadata of either the first instance or a second instance of the payment coupon of the biller to facilitate extracting data from the image or a second image representing the second instance of the payment coupon.

20. The product of claim 19, wherein the respective set of one or more field indicators for the one or more fields within the image comprises at least one of: (a) an x and y coordinate pair indicating the approximate location of the respective field; (b) an x and y coordinate pair indicating the approximate center of the respective field; (c) an x and y coordinate pair indicating a starting point for the respective field; (d) an x and y coordinate pair indicating an ending point for the respective field; (e) an indication of a location of one or more corners of the respective field; (f) a horizontal dimension; (g) a vertical dimension; (h) dimensions of a rectangle; or (i) a distance from a predetermined location within the image.

21. The product of claim 19, wherein the instructions are further configured for execution by the one or more processors to perform the operations of displaying the image with a graphical indication of the location of the one or more fields within the image for confirmation or adjustment by the user.

22. The product of claim 19, wherein the instructions are further configured for execution by the one or more processors to perform the operations of extracting data from the image based at least in part on the respective set of one or more field indicators for the one or more fields within the image.

23. The product of claim 19, wherein the instructions are further configured for execution by the one or more processors to perform the operations of displaying extracted data to the user for confirmation or adjustment by the user, wherein the extracted data is extracted from the image based at least in part on the respective set of one or more field indicators for the one or more fields within the image.

24. The product of claim 19, wherein the computer program product is operable for execution by one of: (a) a mobile device; or (b) a computer.

25. The product of claim 19, wherein the computer program product is operable for execution by a service provider system on behalf of one of: (a) the user associated with the payment coupon; (b) the biller; or (c) a payment service provider system performing payment processing on behalf of one of the biller or the payer.

26. The product of claim 19, wherein the image comprises one of: (a) a scanned image of the payment coupon; or (b) a photograph of the payment coupon.

27. The product of claim 19, wherein the instructions are further configured for execution by the one or more processors to perform the operations of determining the identity of the biller from the image utilizing one of: (a) optical character recognition processing at a predetermined location on the image; or (b) the identity of the biller from the user.

28. The product of claim 27, wherein the instructions are further configured for execution by the one or more processors to perform the operations of storing at least part of the extracted data in association with at least one of: (a) the biller; or (b) the user associated with the payment coupon.

29. The product of claim 27, wherein the instructions are further configured for execution by the one or more processors to perform the operations of processing a payment associated with the payment coupon based at least in part on the extracted data.

30. The product of claim 19, wherein the instructions are further configured for execution by the one or more processors to perform the operations of receiving from the user one or more modifications to the respective set of one or more field indicators for the one or more fields within the image responsive to presenting the image with the graphical indication of the location of the one or more fields within the image to the user.

31. A system, comprising:
at least one memory comprising computer-executable instructions;
at least one communications interface; and
at least one processor in communication with the at least one communications interface and the at least one memory and configured to execute the computer-executable instructions to:
receive, via the at least one communications interface, an image representing a payment coupon;
determine an identity of a biller associated with the payment coupon from the image;
determine, based on the identity of the biller, that no payment coupon metadata for obtaining one or more fields from the payment coupon is stored in association with the biller;
request, via the at least one communications interface, responsive to determining that no payment coupon metadata is stored for the biller, a respective set of one or more field indicators representing at least an approximate size or an approximate location for each of the one or more fields within the image, wherein the request further includes,
present the image to a user, and
instruct the user to graphically indicate on the image at least the approximate size or the approximate location for each of the one or more fields;
receive, via the at least one communications interface, the respective set of one or more field indicators for the one or more fields within the image; and
store, in the memory, the respective set of one or more field indicators for the one or more fields within the image as at least a portion of the payment coupon metadata, wherein the payment coupon metadata is stored in association with the biller.

32. The system of claim 31, wherein the image comprises one of: (a) a scanned image of the payment coupon; or (b) a photograph of the payment coupon.

33. The system of claim 31, wherein, to determine the identity of the biller from the image, the at least one processor is configured to execute the computer-executable instructions to one of: (a) utilize optical character recognition processing at a predetermined location on the image; or (b) receive the identity of the biller from the user.

34. The system of claim 31, wherein the respective set of one or more field indicators for the one or more fields within the image comprises at least one of: (a) an x and y coordinate pair indicating the approximate location of the respective field; (b) an x and y coordinate pair indicating the approximate center of the respective field; (c) an x and y coordinate pair indicating a starting point for the respective field; (d) an x and y coordinate pair indicating an ending point for the respective field; (e) an indication of a location of one or more corners of the respective field; (f) a horizontal dimension; (g) a vertical dimension; (h) dimensions of a rectangle; or (i) a distance from a predetermined location within the image.

35. The system of claim 31, wherein the at least one processor is further configured to execute the computer-executable instructions to extract data from the image based at least in part on the respective set of one or more field indicators for the one or more fields within the image.

36. The system of claim 35, wherein the at least one processor is further configured to execute the computer-executable instructions to present the extracted data to a user for confirmation or modification.

37. The system of claim 35, wherein the at least one processor is further configured to execute computer-executable instructions to store at least part of the extracted data in association with at least one of: (a) the biller; or (b) the user associated with the payment coupon.

38. The system of claim 35, wherein the at least one processor is further configured to execute computer-executable instructions to process a payment associated with the payment coupon based at least in part on the extracted data.

39. The system of claim 31, wherein the at least one processor is further configured to execute the computer-executable instructions to receive from the user one or more modifications to the respective set of one or more field indicators for the one or more fields within the image responsive to presenting the image with the graphical indication of the location of the one or more fields within the image to the user.

* * * * *